United States Patent
Russell et al.

(10) Patent No.: US 12,152,902 B2
(45) Date of Patent: Nov. 26, 2024

(54) ENVIRONMENT MAPPING BASED ON UWB TAGS

(71) Applicant: Motorola Mobility LLC, Chicago, IL (US)

(72) Inventors: Michael E. Russell, Lake Zurich, IL (US); Jarrett K. Simerson, Northbrook, IL (US); Thomas Yates Merrell, St Charles, IL (US)

(73) Assignee: Motorola Mobility LLC, Chicago, IL (US)

( * ) Notice: Subject to any disclaimer, the term of this patent is extended or adjusted under 35 U.S.C. 154(b) by 215 days.

(21) Appl. No.: 17/473,477

(22) Filed: Sep. 13, 2021

(65) Prior Publication Data
US 2023/0079580 A1    Mar. 16, 2023

(51) Int. Cl.
*H04W 4/80* (2018.01)
*G01C 21/00* (2006.01)

(52) U.S. Cl.
CPC ....... *G01C 21/383* (2020.08); *G01C 21/3841* (2020.08)

(58) Field of Classification Search
CPC .. G01C 21/38; G01C 21/3804; G01C 21/383; G01C 21/3841; H04W 4/30; H04W 4/33; H04W 4/80
See application file for complete search history.

(56) References Cited

U.S. PATENT DOCUMENTS

| 6,677,895 B1 | 1/2004 | Holt |
| 7,976,386 B2 | 7/2011 | Tran |
| 8,483,853 B1 | 7/2013 | Lambourne |

(Continued)

FOREIGN PATENT DOCUMENTS

| CN | 107907857 A | 4/2018 |
| CN | 107991647 A | 5/2018 |

(Continued)

OTHER PUBLICATIONS

"IEEE Standard for Low-Rate Wireless Networks—Amendment 1: Enhanced Ultra Wideband (UWB) Physical Layers (PHYs) and Associated Ranging Techniques", IEEE 802.15.4z-2020 [retrieved Nov. 16, 2022]. Retrieved from the Internet <10.1109/IEEESTD.2020.9179124>., Aug. 25, 2020, 174 Pages.

(Continued)

*Primary Examiner* — Blane J Jackson
(74) *Attorney, Agent, or Firm* — FIG. 1 Patents

(57) ABSTRACT

In aspects of environment mapping based on UWB tags, a system includes ultra-wideband (UWB) tags located for association with respective objects in an environment, where each UWB tag is identified with a digital label indicative of the association with one or more of the objects. A mapping module is implemented to determine a location of each of the UWB tags in the environment, and determine relative positions of each of the UWB tags with respect to each other. The mapping module can generate a location association map of the objects in the environment based on the location and the relative position of each of the UWB tags associated with the respective objects. In an environment within a building, the mapping module can generate the location association map as a floor plan of the building, including the objects location in the building.

20 Claims, 9 Drawing Sheets

(56) References Cited

U.S. PATENT DOCUMENTS

| | | | |
|---|---|---|---|
| 9,244,525 | B2 | 1/2016 | Crawford et al. |
| 10,158,536 | B2 | 12/2018 | Kim et al. |
| 10,277,981 | B1 | 4/2019 | Frank |
| 10,484,832 | B1 | 11/2019 | Tyagi et al. |
| 10,499,194 | B1 | 12/2019 | Tyagi et al. |
| 10,554,439 | B2 | 2/2020 | Plummer et al. |
| 10,869,166 | B2 | 12/2020 | Tyagi et al. |
| 11,051,260 | B2 | 6/2021 | Gorsica et al. |
| 11,543,530 | B1 | 1/2023 | Liu et al. |
| 11,990,012 | B2 | 5/2024 | Russell et al. |
| 12,004,046 | B2 | 6/2024 | Russell et al. |
| 12,063,059 | B2 | 8/2024 | Russell et al. |
| 12,069,120 | B2 | 8/2024 | Russell et al. |
| 2007/0254626 | A1 | 11/2007 | Ahlgren |
| 2012/0027194 | A1 | 2/2012 | Deshpande et al. |
| 2013/0310055 | A1 | 11/2013 | Dewing et al. |
| 2014/0057675 | A1 | 2/2014 | Meyers et al. |
| 2014/0073252 | A1 | 3/2014 | Lee et al. |
| 2015/0193036 | A1 | 7/2015 | Yoo et al. |
| 2016/0212579 | A1* | 7/2016 | Duan ............... H04W 4/90 |
| 2017/0013406 | A1 | 1/2017 | Oliver et al. |
| 2017/0039783 | A1 | 2/2017 | Hobel |
| 2017/0245116 | A1 | 8/2017 | Chu et al. |
| 2017/0289951 | A1 | 10/2017 | Dey et al. |
| 2018/0045807 | A1 | 2/2018 | Senna et al. |
| 2018/0107446 | A1 | 4/2018 | Wilberding et al. |
| 2018/0302869 | A1 | 10/2018 | Hollar |
| 2019/0041869 | A1 | 2/2019 | Shao et al. |
| 2019/0132839 | A1 | 5/2019 | Li et al. |
| 2019/0182734 | A1 | 6/2019 | Laliberte |
| 2019/0208270 | A1 | 7/2019 | Bates et al. |
| 2019/0340396 | A1 | 11/2019 | Mills et al. |
| 2020/0037112 | A1 | 1/2020 | Tyagi et al. |
| 2020/0228943 | A1 | 7/2020 | Martin et al. |
| 2020/0401365 | A1 | 12/2020 | Wilberding et al. |
| 2021/0063556 | A1 | 3/2021 | Usaj et al. |
| 2021/0064043 | A1 | 3/2021 | Kulkarni et al. |
| 2021/0088456 | A1 | 3/2021 | Asayama et al. |
| 2021/0092563 | A1 | 3/2021 | Hollar et al. |
| 2021/0190940 | A1 | 6/2021 | Troutman |
| 2021/0224492 | A1 | 7/2021 | Eisendle et al. |
| 2021/0241551 | A1 | 8/2021 | Loeshelle |
| 2021/0304577 | A1 | 9/2021 | Hollar et al. |
| 2021/0320681 | A1 | 10/2021 | Baek et al. |
| 2021/0383624 | A1 | 12/2021 | Hoyer et al. |
| 2022/0095120 | A1 | 3/2022 | Panje et al. |
| 2022/0201427 | A1* | 6/2022 | Rechenberger ....... H04W 4/025 |
| 2022/0244367 | A1 | 8/2022 | Shin et al. |
| 2022/0283321 | A1* | 9/2022 | Ng ............................ G01S 5/14 |
| 2022/0394347 | A1 | 12/2022 | Cheong et al. |
| 2022/0394660 | A1 | 12/2022 | Werner et al. |
| 2023/0075389 | A1 | 3/2023 | Wu et al. |
| 2023/0078485 | A1 | 3/2023 | Russell et al. |
| 2023/0168343 | A1 | 6/2023 | Russell et al. |
| 2023/0169839 | A1 | 6/2023 | Russell et al. |
| 2023/0171298 | A1 | 6/2023 | Russell et al. |
| 2023/0184561 | A1 | 6/2023 | Salter et al. |
| 2023/0195411 | A1 | 6/2023 | Lewis et al. |
| 2023/0217210 | A1 | 7/2023 | Russell et al. |
| 2023/0217215 | A1 | 7/2023 | Russell et al. |
| 2023/0231591 | A1 | 7/2023 | Russell et al. |
| 2024/0031932 | A1 | 1/2024 | Zhang |
| 2024/0196130 | A1 | 6/2024 | Agrawal et al. |

FOREIGN PATENT DOCUMENTS

| | | |
|---|---|---|
| CN | 108650623 A | 10/2018 |
| CN | 109725338 A | 5/2019 |
| CN | 109754553 A | 5/2019 |
| CN | 111103611 A | 5/2020 |
| CN | 112911505 A | 6/2021 |
| CN | 113115208 A | 7/2021 |
| CN | 113453147 A | 9/2021 |
| CN | 217643343 U | 10/2022 |
| EP | 3680687 A1 | 7/2020 |
| KR | 102104088 B1 | 4/2020 |
| KR | 102328673 B1 | 11/2021 |
| WO | 2019221800 A1 | 11/2019 |

OTHER PUBLICATIONS

"Proximity Profile (PXP)", Bluetooth SIG, Inc. [retrieved Nov. 18, 2022]. Retrieved from the Internet <https://www.bluetooth.com/specifications/specs/proximity-profile-1-0-1/>., Jan. 25, 2022, 11 Pages.

"Proximity Profile 1.0.1", Bluetooth SIG, Inc. [retrieved Nov. 18, 2022]. Retrieved from the Internet <https://www.bluetooth.com/specifications/specs/proximity-profile-1-0-1/>., Jul. 14, 2015, 20 Pages.

"Test Suite (TS)", Bluetooth SIG, Inc. [retrieved Nov. 18, 2022]. Retrieved from the Internet <https://www.bluetooth.com/specifications/specs/proximity-profile-1-0-1/>., Jul. 29, 2019, 23 Pages.

Davis, Giles T, et al., "US Application as Filed", U.S. Appl. No. 17/708,410, filed Mar. 30, 2022, 61 pages.

U.S. Appl. No. 17/536,535 , "Non-Final Office Action", U.S. Appl. No. 17/536,535, Apr. 18, 2023, 20 pages.

Cheong, Minho , et al., "US Provisional Application as Filed", U.S. Appl. No. 63/197,867, filed Jun. 7, 2021, 68 pages.

GB2213121.3 , "Search Report", GB Application No. GB2213121.3, Mar. 9, 2023, 5 pages.

GB2216213.5 , "Combined Search and Examination Report", GB Application No. GB2216213.5, Apr. 28, 2023, 10 pages.

U.S. Appl. No. 17/536,636 , filed Mar. 3, 2023 , "Non-Final Office Action", U.S. Appl. No. 17/536,636, Mar. 3, 2023, 12 pages.

U.S. Appl. No. 17/579,933 , "Non-Final Office Action", U.S. Appl. No. 17/579,933, Mar. 16, 2023, 8 pages.

GB2213053.8 , "Combined Search and Examination Report", GB Application No. GB2213053.8, Feb. 23, 2023, 10 pages.

Russell, Michael E, et al., "US Application as Filed", U.S. Appl. No. 18/097,611, filed Jan. 17, 2023, 71 pages.

"[Update] Introducing the New Galaxy SmartTag+: The Smart Way to Find Lost Items", Samsung US Newsroom [online][retrieved Jun. 29, 2021]. Retrieved from the Internet <https://news.samsung.com/us/introducing-the-new-galaxy-smarttag-plus/>., May 11, 2021, 8 Pages.

"Car Connectivity Consortium", Car Connectivity Consortium [retrieved Jun. 28, 2021]. Retrieved from the Internet <https://carconnectivity.org/>., Feb. 22, 2018, 6 Pages.

"FiRa Consortium, Inc.", FiRa Consortium, Inc. [retrieved Jun. 28, 20218]. Retrieved from the Internet <https://www.firaconsortium.org/>., Aug. 1, 2019, 3 Pages.

"Tile Bluetooth Tracking Device", Tile Inc. [retrieved Jun. 28, 2021]. Retrieved from the Internet <https://www.thetileapp.com/en-us/how-it-works>., 2012, 18 Pages.

Haselton, Todd , "Here's how Apple's AirTag trackers compare to Tile, and why the company is so upset with Apple", CNBC [online][retrieved Jun. 29, 2021]. Retrieved from the Internet <https://www.cnbc.com/2021/04/27/apple-airtags-versus-tile-tracker-how-they-compare.html>., Apr. 27, 2021, 8 Pages.

Pirch, Hans-Juergen et al., "Introduction to Impulse Radio UWB Seamless Access Systems", FiRa Consortium [retrieved Jun. 28, 2021]. Retrieved from the Internet <https://www.firaconsortium.org/sites/default/files/2020-04/fira-introduction-impulse-radio-uwb-wp-en.pdf>., Feb. 2020, 15 Pages.

U.S. Appl. No. 17/473,671 , "Non-Final Office Action", U.S. Appl. No. 17/473,671, Jul. 14, 2023, 6 pages.

U.S. Appl. No. 17/536,535 , "Final Office Action", U.S. Appl. No. 17/536,535, Aug. 11, 2023, 25 pages.

U.S. Appl. No. 17/536,636 , "Non-Final Office Action", U.S. Appl. No. 17/536,636, Jul. 13, 2023, 14 pages.

U.S. Appl. No. 17/579,933 , "Final Office Action", U.S. Appl. No. 17/579,933, Jun. 12, 2023, 10 pages.

U.S. Appl. No. 63/261,929 , "Provisional Application", U.S. Appl. No. 63/261,929, Sep. 30, 2021, 62 pages.

U.S. Appl. No. 17/473,671 , "Notice of Allowance", U.S. Appl. No. 17/473,671, Jan. 24, 2024, 7 pages.

(56) References Cited

OTHER PUBLICATIONS

U.S. Appl. No. 17/536,535, "Non-Final Office Action", U.S. Appl. No. 17/536,535, Dec. 29, 2023, 26 pages.
U.S. Appl. No. 17/536,636, "Corrected Notice of Allowability", U.S. Appl. No. 17/536,636, Jan. 19, 2024, 3 pages.
U.S. Appl. No. 17/536,636, "Notice of Allowance", U.S. Appl. No. 17/536,636, Jan. 10, 2024, 9 pages.
U.S. Appl. No. 17/566,530, "Non-Final Office Action", U.S. Appl. No. 17/566,530, Nov. 9, 2023, 14 pages.
U.S. Appl. No. 17/579,933, "Non-Final Office Action", U.S. Appl. No. 17/579,933, Dec. 19, 2023, 11 pages.
U.S. Appl. No. 17/473,477, "Advisory Action", U.S. Appl. No. 17/473,477, Feb. 12, 2024, 3 pages.
U.S. Appl. No. 17/473,671, "Corrected Notice of Allowability", U.S. Appl. No. 17/473,671, Mar. 27, 2024, 2 pages.
U.S. Appl. No. 17/536,499, "Non-Final Office Action", U.S. Appl. No. 17/536,499, Mar. 22, 2024, 13 pages.
U.S. Appl. No. 17/536,535, "Corrected Notice of Allowability", U.S. Appl. No. 17/536,535, Apr. 24, 2024, 2 pages.
U.S. Appl. No. 17/536,535, "Corrected Notice of Allowability", U.S. Appl. No. 17/536,535, May 3, 2024, 2 pages.
U.S. Appl. No. 17/536,535, "Notice of Allowance", U.S. Appl. No. 17/536,535, Apr. 10, 2024, 7 pages.
U.S. Appl. No. 17/536,636, "Corrected Notice of Allowability", U.S. Appl. No. 17/536,636, Feb. 5, 2024, 3 pages.
U.S. Appl. No. 17/536,636, "Corrected Notice of Allowability", U.S. Appl. No. 17/536,636, Apr. 17, 2024, 3 pages.
U.S. Appl. No. 17/566,530, "Final Office Action", U.S. Appl. No. 17/566,530, Feb. 16, 2024, 16 pages.
U.S. Appl. No. 17/579,933, "Corrected Notice of Allowability", U.S. Appl. No. 17/579,933, Apr. 10, 2024, 3 pages.
U.S. Appl. No. 17/579,933, "Corrected Notice of Allowability", U.S. Appl. No. 17/579,933, Apr. 23, 2024, 3 pages.
U.S. Appl. No. 17/579,933, "Notice of Allowance", U.S. Appl. No. 17/579,933, Mar. 29, 2024, 6 pages.
U.S. Appl. No. 17/536,499, "Final Office Action", U.S. Appl. No. 17/536,499, filed Aug. 1, 2024, 16 pages.
U.S. Appl. No. 17/473,671, filed May 6, 2024, "Corrected Notice of Allowability", U.S. Appl. No. 17/473,671, filed May 6, 2024, 2 pages.
U.S. Appl. No. 17/536,535, filed Jun. 20, 2024, "Corrected Notice of Allowability", U.S. Appl. No. 17/536,535, filed Jun. 20, 2024, 2 pages.
U.S. Appl. No. 17/536,535, filed Jul. 17, 2024, "Supplemental Notice of Allowability", U.S. Appl. No. 17/536,535, filed Jul. 17, 2024, 2 pages.
U.S. Appl. No. 17/566,530, filed Jun. 10, 2024, "Non-Final Office Action", U.S. Appl. No. 17/566,530, filed Jun. 10, 2024, 17 pages.
U.S. Appl. No. 17/579,933, filed Jul. 9, 2024, "Corrected Notice of Allowability", U.S. Appl. No. 17/579,933, filed Jul. 9, 2024, 3 pages.
U.S. Appl. No. 17/566,530, filed Sep. 18, 2024, "Notice of Allowance", U.S. Appl. No. 17/566,530, filed Sep. 18, 2024, 8 pages.

* cited by examiner

ENVIRONMENT MAPPING BASED ON UWB TAGS

BACKGROUND

Ultra-wideband (UWB) is a radio technology that can be utilized for secure, spatial location applications using very low energy for short-range, high-bandwidth communications. The technology is detailed by the IEEE 802.15.4z standard for Enhanced Ultra-Wideband (UWB) Physical Layers (PHYs) and Associated Ranging Techniques for accurate relative position tracking, which provides for applications using relative distance between entities. Notably, UWB utilizes double-sided, two-way ranging between devices and provides for highly precise positioning, within 10 cm of ranging accuracy in as little as three degrees of precision through time-of-flight (ToF) and angle-of-arrival (AoA) measurements at up to 100 m through the use of impulse radio communications in the 6-10 GHz frequency range. The positioning is an accurate and secure technology using the scrambled timestamp sequence (STS), cryptographically secure pseudo-random number generation, and other features of the UWB PHY.

BRIEF DESCRIPTION OF THE DRAWINGS

Implementations of the techniques for environment mapping based on UWB tags are described with reference to the following Figures. The same numbers may be used throughout to reference like features and components shown in the Figures.

DETAILED DESCRIPTION

Figure 1:
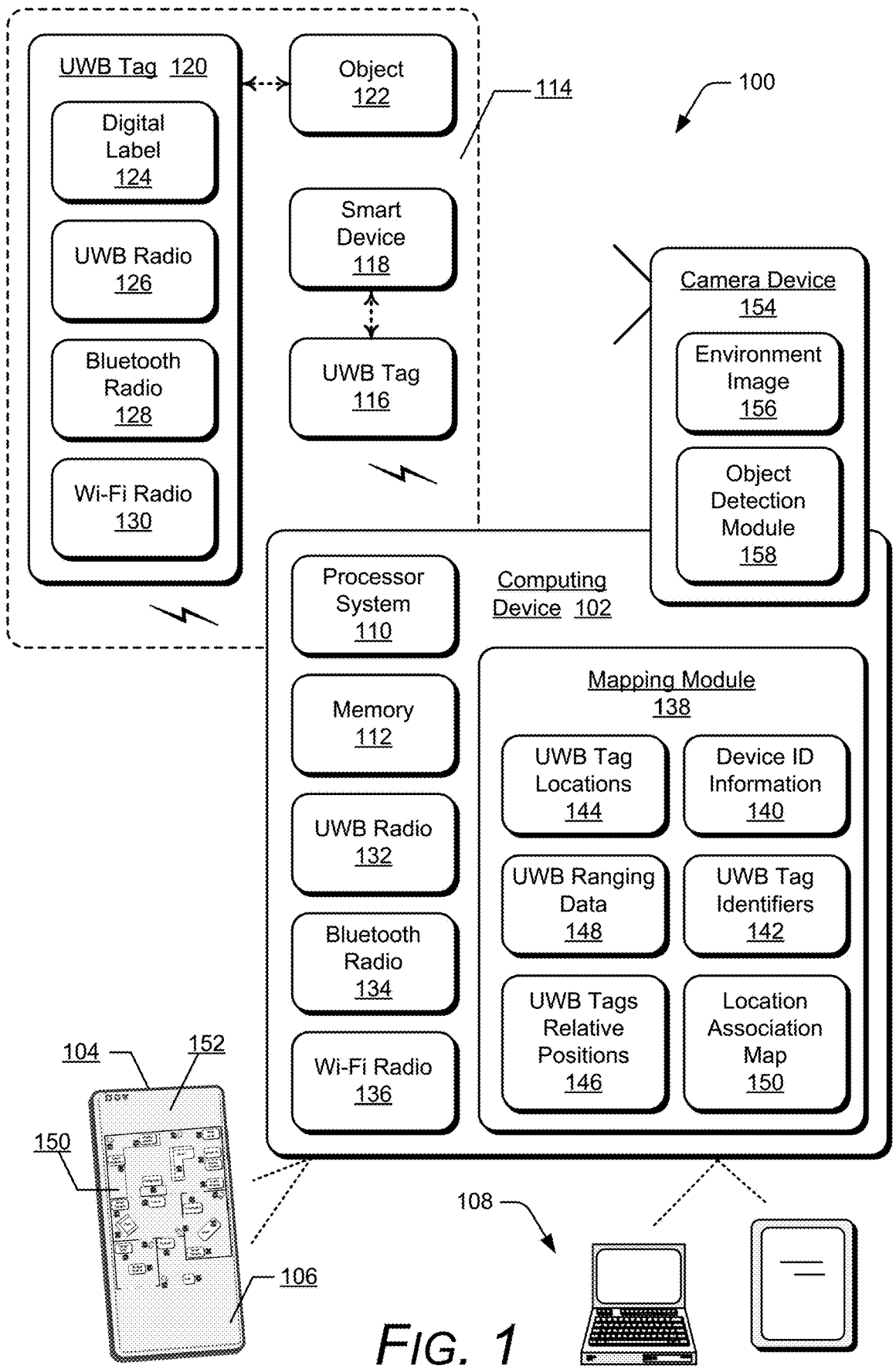
FIG. 1 illustrates example devices and features for environment mapping based on UWB tags in accordance with one or more implementations as described herein.

Implementations of techniques for environment mapping based on ultra-wideband (UWB) tags are described, and provide techniques that can be implemented by any type of computing devices, such as smart devices, mobile devices (e.g., cellular phones, tablet devices, smartphones, wireless devices), consumer electronics, smart home automation devices, and the like. Generally, UWB-enabled smart devices, such as smartphones and home automation devices, can be used to determine spatial awareness that provides features implemented in smart homes and buildings with access control, security, location-based services, and peer-to-peer applications.

Aspects of environment mapping based on UWB tags provide for automating the distribution, identification, and placement of UWB tags in an environment, such as in a smart home or other type of building environment. The described techniques utilize UWB ranging data, such as time-of-flight (ToF), angle-of-arrival (AoA), and/or time-difference-of-arrival (TDoA), as well as Wi-Fi and/or Bluetooth RSSI measurements, and optionally camera imaging, to determine UWB tag locations in the environment, generate a floor plan, and provide semantic names for detected devices and objects. The UWB precise location positioning capabilities is utilized to enable location detection of UWB tags at particular locations in the environment, which can then be used to enhance the wireless and digital experience in a smart home environment by utilizing the precise and secure location positioning features.

These features are an improvement over the earlier techniques, commonly referred to as Wi-Fi fingerprinting, which builds a grid-based distance map based on triangulation of radio communications. For example, a home environment that includes wireless devices, which may be implemented with Bluetooth, Bluetooth Low Energy (BLE), and/or Wi-Fi, and the RF signatures from these devices can be used for fingerprinting to create a relative location map between the fixed points and a moving device in the region of an environment. However, there are limitations to these fingerprinting methods and RF signatures change over time.

In aspects of the described techniques for environment mapping, a system includes UWB tags located for association with respective objects in an environment, where each UWB tag is identified with a digital label indicative of the association with one or more of the objects. A UWB tag can be located for association with a smart device or other object in the environment, and the UWB tag can determine an identity of the smart device based on a Bluetooth MAC ADDR and/or other device identifying information communicated from the smart device. Alternatively or in addition, a mobile device has a network association with the smart device in the environment, and the UWB tag that is located for the association with the smart device in the environment can receive the identity of the smart device from the mobile device.

The UWB tags can scan to receive device identifying information communicated from nearby smart devices in the environment. The device identifying information is communicated via Bluetooth or BLE from the smart devices as a device name, a Bluetooth MAC ADDR, and a received signal strength indication (RSSI). A UWB tag can identify the smart device that is located nearest to the UWB tag based on the device identifying information received from the smart devices, and generate an ordered list of the smart devices based on the device identifying information to identify the smart device that is located nearest to the UWB tag. Alternatively or in addition, a computing device in the environment implements a mapping module that can receive and process the Bluetooth or BLE advertised communications from the UWB tags and smart devices in the environment. The mapping module can then correlate a UWB tag with a proximate smart device based on RSSI measurements of the Bluetooth or BLE advertised communications from the UWB tags and smart devices.

The mapping module is implemented to determine a location of each of the UWB tags in the environment, and determine relative positions of each of the UWB tags with respect to each other. The mapping module can obtain UWB ranging data received from the UWB tags via in-band session exchanges with a UWB radio, and determine the location and the relative position of each of the UWB tags in the environment based on the UWB ranging data. The mapping module can then generate a location association map of the objects and smart devices in the environment based on the location and the relative position of each of the UWB tags associated with the respective objects and smart devices. For an environment within a building, such as in a smart home environment, the mapping module can generate the location association map as a floor plan of the building in a three-dimension coordinate system, including the objects and/or the smart devices locations in the building.

In implementations, a camera device in the environment can be used to capture an image of a region of the environment. An object detection module can be used to identify the objects and/or smart devices in the region of the environment from the captured image, and the mapping module can determine the location and the relative position of each of the UWB tags in the region of the environment based on the identified objects and smart devices in the environment. Additionally, the mapping module can generate the location association map as a floor plan of the building, including the objects and/or smart devices locations in the building, with the floor plan including positions of the walls of the building as determined from the captured image.

While features and concepts of the described techniques for environment mapping based on UWB tags can be implemented in any number of different devices, systems, environments, and/or configurations, implementations of the techniques for environment mapping based on UWB tags are described in the context of the following example devices, systems, and methods.

FIG. 1 illustrates an example system 100 for environment mapping based on UWB tags, as described herein. Generally, the system 100 includes a computing device 102, which can be utilized to implement features and techniques of the environment mapping. In this example system 100, the computing device 102 may be a wireless device 104 with a display screen 106, such as a smartphone or mobile phone. Alternatively or in addition, the system 100 can include the computing device 102 as any type of an electronic, computing, and/or communication device 108, such as a computer, a laptop device, a desktop computer, a tablet, a wireless device, a camera device, a smart device, a smart display, a smart TV, a smart appliance, a home automation device, and so forth. The computing device 102 can be implemented with various components, such as a processor system 110 and memory 112, as well as any number and combination of different components as further described with reference to the example device shown in FIG. 9. For example, the wireless device 104 can include a power source to power the device, such as a rechargeable battery and/or any other type of active or passive power source that may be implemented in an electronic, computing, and/or communication device.

In implementations, the wireless device 104 may be communicatively linked, generally by wireless connection, to UWB tags and/or to other devices embedded with UWB in an environment 114. Generally, the environment 114 can include the computing device 102, the wireless device 104, smart devices, the UWB tags, and devices implemented with UWB, as well as any number of the other types of electronic, computing, and/or communication devices 108 described herein. The wireless UWB communications in the environment 114 are similar between the UWB tags and/or UWB-embedded devices in the environment. The UWB tags can be placed in the environment proximate each of the objects and/or smart devices and then labeled with a functional name to indicate a UWB tag association with a particular object and/or smart device. Given the angular precision and centimeter accurate ranging that UWB provides, location detection of UWB tags at particular locations in the environment can be used to enhance the wireless and digital experience in a smart home environment.

In this example system 100, smart devices may include an embedded UWB radio, and a UWB tag 116 may be associated with a smart device 118 in the environment 114. Similarly, a UWB tag 120 may be associated with any type of object 122 in the environment. For example, the UWB tags can be positioned and located in the environment 114 for association with respective smart devices and/or objects, and each UWB tag can be identified with a digital label 124 indicative of the association with one or more of the objects and/or smart devices in the environment. For example, the object 122 may be a smart TV in a home environment, and the digital label 124 of the UWB tag 120 indicates "smart TV" as the identifier of the UWB tag association. Similarly, the object 122 may be a floor lamp in the home environment, and the digital label 124 of the UWB tag 120 indicates "floor lamp" as the identifier of the UWB tag association.

In some instances, smart devices and/or objects in the environment 114 may already be UWB-enabled for wireless communication with the other devices and UWB tags in the environment. The wireless UWB communications for mapping objects and/or devices in the environment 114 are similar between the UWB tags and/or UWB-embedded smart devices in the environment. A network of the UWB tags in the environment 114 can discover and communicate between themselves and/or with a control device or controller logic that manages the smart devices and UWB tags in the environment.

In implementations, a UWB tag 120 can be used at a fixed location to facilitate accurate location and positioning of inanimate objects and/or areas in the environment 114, such as positioning the UWB tag 120 on a blank wall in a home environment. Generally, the object 122 associated with the UWB tag 120 would then be the portion of the blank wall proximate the UWB tag. Given the known location of the blank wall in the home environment, a user may then overlay augmented reality (AR) information on the blank wall and interact with the digital world that is anchored by the UWB tag 120, even though the wall is inherently not an electronic device. Similarly, the UWB tags in the environment 114 can allow for an AR-guided user experience, such as to locate a missing item or other misplaced device. If a user loses or misplaces a smartphone or smart watch, the precision of location detection provided by the system of UWB tags can guide a user to the location of the missing item in the environment.

The UWB protocol is designed to utilize out-of-band communications that use low-power, wireless protocols for UWB device discovery and UWB session configuration, such as via Bluetooth or Bluetooth Low Energy (BLE), which uses less power than if a UWB radio was used alone. Additionally, using BLE for UWB out-of-band communications provides for a large network effect given the number of devices that are already BLE-enabled. Because BLE is able to receive and decode advertising packets, the UWB tags placed in the environment 114 proximate a smart device, for example, can determine the nearest Bluetooth MAC ADDR and likely an indication of the device name of the nearby smart device. When the nearest device name is not advertised, the UWB tag can check against the BD ADDR that is already known on the computing device 102, which is also particularly useful if privacy settings are enabled and an identity resolving key is not available on the UWB Tag.

Alternatively or in addition to a UWB tag receiving address and device identifying information from nearby smart devices, and identifying the smart device that is located nearest to the UWB tag, a computing device can communicate with the UWB tags 120 and the smart devices in the environment, and receive Bluetooth or BLE advertised communications from the UWB tags and smart devices. The computing device may be a centralized controller and/or mobile device in the environment that correlates a UWB tag with a nearby smart device based on RSSI measurements of the Bluetooth or BLE advertised communications from the UWB tags and smart devices. For example, the computing device can receive advertised signals from a UWB tag and a smart device, and compare the signal path loss from the received signals to determine that the UWB tag and smart device are proximate each other in the environment based on similar signal path loss.

In aspects of the described features for environment mapping based on UWB tags, user interaction can be minimized or eliminated as the UWB tags are implemented to automate identification and labeling, such as by using Bluetooth or BLE communications and/or captured images. For example, when the UWB tag 116 is located for association with the smart device 118 in the environment 114, the UWB tag can determine an identity of the smart device based on a Bluetooth MAC ADDR and/or other device identifying information communicated from the smart device. Additionally, the UWB tag 116 can utilize received Wi-Fi or Bluetooth RSSI measurements in conjunction with the UWB positioning information to generate and sort a list of nearby smart devices, and select the MAC ADDR of the smart device closest to the UWB tag. Further, in an environment 114 that includes the computing device 102, such as a mobile phone, smartphone, or other wireless device that has a network association with the smart device 118, the UWB tag 116 that is located for association with the smart device 118 in the environment can receive an identity of the smart device 118 from the computing device.

In this example system 100, the UWB tag 120, which is generally representative of any UWB tag or device with embedded UWB in the environment 114, can include various radios for wireless communications with other devices and/or with the other UWB tags in the environment. For example, the UWB tag 120 can include a UWB radio 126, a Bluetooth radio 128, and/or a Wi-Fi radio 130 implemented for wireless communications with other devices and the UWB tags in the environment 114. The computing device 102 also includes various radios for wireless communication with the other devices and/or with the UWB tags in the environment 114. For example, the computing device 102 includes a UWB radio 132, a Bluetooth radio 134, and a Wi-Fi radio 136 implemented for wireless communications with other devices and with the UWB tags in the environment 114.

The computing device 102 can also implement any number of device applications and/or modules, such as any type of a messaging application, communication application, media application, and/or any other of the many possible types of device applications or application modules. In this example system 100, the computing device 102 implements a mapping module 138, which may include independent processing, memory, and/or logic components functioning as a computing and/or electronic device integrated with the computing device 102. Alternatively or in addition, the mapping module 138 can be implemented in software, in hardware, or as a combination of software and hardware components. In this example, the mapping module 138 is implemented as a software application or module, such as executable software instructions (e.g., computer-executable instructions) that are executable with a processor (e.g., with the processor system 110) of the computing device 102 to implement the techniques and features for environment mapping based on UWB tags, as described herein.

As a software application or module, the mapping module 138 can be stored on computer-readable storage memory (e.g., the memory 112 of the device), or in any other suitable memory device or electronic data storage implemented with the module. Alternatively or in addition, the mapping module 138 may be implemented in firmware and/or at least partially in computer hardware. For example, at least part of the module may be executable by a computer processor, and/or at least part of the module may be implemented in logic circuitry.

As described above, the UWB tag 116 that is located for association with the smart device 118 in the environment 114 can determine an identity of the smart device based on a Bluetooth MAC ADDR and/or other device identifying information communicated from the smart device. Generally, the UWB tags can scan to receive device identifying information 140 communicated from nearby smart devices in the environment. The device identifying information 140 can be communicated via Bluetooth or BLE from the smart devices as a device name, a Bluetooth MAC ADDR, and a received signal strength indication (RSSI). The UWB tag 116 can identify the smart device 118 that is located nearest to the UWB tag based on the device identifying information 140 received from the smart devices, and generate an ordered list of the smart devices based on the device identifying information to identify the smart device that is located nearest to the UWB tag. Additionally, the mapping module 138 implemented by the computing device 102 can receive the device identifying information 140 communicated from the smart devices in the environment, as well as the UWB tag identifiers 142 communicated from the UWB tags in the environment.

In other implementations, and as described above, the computing device 102 can communicate with the UWB tags 116, 120 and other smart devices 118 in the environment 114, receiving Bluetooth or BLE advertised communications from the UWB tags and smart devices. The computing device implements the mapping module 138, which can correlate a UWB tag 120 with a nearby smart device 118 based on RSSI measurements of the Bluetooth or BLE advertised communications from the UWB tags and smart devices. For example, the computing device 102 can receive advertised signals from the UWB tags 116, 120 and the smart devices 118, and the mapping module 138 compares the signal path loss from the received signals to determine which of the UWB tags and smart devices are proximate each other based on similar signal path loss. The mapping module 138 can then associate a UWB tag with a nearby smart device, and communicate the association back to the UWB tag, such as via in-band UWB communications.

In aspects of the described techniques for environment mapping based on UWB tags, the mapping module 138 implemented by the computing device 102 can determine a UWB tag location 144 of each of the UWB tags 120 in the environment 114, and determines the relative positions 146 of each of the UWB tags with respect to each other. The mapping module 138 can obtain UWB ranging data 148, such as time-of-flight (ToF), angle-of-arrival (AoA), and/or time-difference-of-arrival (TDoA) data, as received from the UWB tags 120 via in-band session exchanges with the UWB radio 132 of the computing device 102. The ToF is a two-way communication between a UWB tag 120 and another device, while TDoA is one-way communication, where the UWB tag 120 communicates a signal but does not need to wait for a reply, such as from the computing device 102. The mapping module 138 may also receive and utilize other communication data that is shared over Bluetooth or BLE, such as relative position data shared between UWB devices. The mapping module 138 can then determine the location 144 and the relative position 146 of each of the UWB tags 120 in the environment 114 based on the UWB ranging data 148.

The mapping module 138 can then generate a location association map 150 of the smart devices 118 and/or the objects 122 in the environment 114 based on the location 144 and the relative position 146 of each of the UWB tags 116, 120 associated with the respective smart devices and objects. For an environment within a building, such as in a smart home environment, the mapping module 138 can generate the location association map 150 as a floor plan in a three-dimension coordinate system of the environment 114, including the location of the smart devices and/or the objects in the building environment. An example of a location association map 150 showing the location of the smart devices and/or the objects in the environment 114 is further shown and described with reference to FIG. 2.

As a device application, the mapping module 138 may have an associated application user interface 152 that is generated and displayed for user interaction and viewing, such as on the display screen 106 of the wireless device 104. Generally, an application user interface 152, or any other type of video, image, graphic, and the like is digital image content that is displayable on the display screen 106 of the wireless device 104. The mapping module 138 can initiate to display the location association map 150 on the display screen 106 of the wireless device 104, such as in the user interface 152 of the mapping module 138.

Although the mapping module 138 is shown and described as being implemented by the computing device 102 in the environment 114, any of the other smart devices in the environment may implement the mapping module 138 and/or an instantiation of the mapping module. For example, the system 100 includes a camera device 154, which may be an independent electronic, computing, and/or communication device in the environment 114, and can implement the mapping module 138. Similarly, a control device or controller logic in the environment 114 can implement the mapping module, as well as the UWB tag 120 may implement the mapping module 138 in the environment.

In this example system 100, the camera device 154 may be implemented as a security camera, indoor environment camera, a doorbell camera, and the like. Generally, the camera device 154 may be implemented with any number and combination of the components described with reference to the computing device 102, where the camera device 154 can include an integrated UWB radio, as well as independent processing, memory, and/or logic components functioning as a computing and camera device. Alternatively, the camera device 154 may be implemented as a component of the computing device 102, such as in a mobile phone or other wireless device with one or more camera devices to facilitate image capture.

The camera device 154, such as any type of a security camera, indoor environment camera, a doorbell camera, or a camera device of the computing device 102, can be utilized to further implement the techniques for environment mapping based on UWB tags. The camera device 154 can be used to capture an image 156 of the environment 114 (or a region of the environment), and the camera device implements an object detection module 158 utilized to identify the objects 122 and/or the smart devices 118 in the region of the environment from the captured image. Similar to the mapping module 138, the object detection module 158 may include independent processing, memory, and/or logic components functioning as a computing and/or electronic device integrated with the camera device 154 and/or with the computing device 102. Alternatively or in addition, the object detection module 158 can be implemented in software, in hardware, or as a combination of software and hardware components. In this example, the object detection module 158 is implemented as a software application or module, such as executable software instructions (e.g., computer-executable instructions) that are executable with a device processor and stored on computer-readable storage memory (e.g., on memory of the device).

In a building environment, such as in a smart home implementation, the mapping module 138 can generate the location association map 150 of the smart devices 118 and/or the objects 122 in the environment 114 based on the identified objects and/or smart devices in the environment, as determined by the object detection module 158 from the captured environment image 156. The mapping module 138 can then generate the location association map 150 as a floor plan of the building, including the objects and/or the smart devices locations in the building, with the floor plan including positions of walls of the building as determined from the captured environment image 156. An example of a location association map 150 generated as a floor plan including positions of walls of the building, as well as the locations of the smart devices and/or the objects in the environment 114, is further shown and described with reference to FIG. 3.

In an example use case, a user can start the mapping module 138 as an application on the wireless device 104 (e.g., a mobile phone), as well as place the UWB tags 116, 120 for association with the smart devices 118 and/or the objects 122 in the environment 114. An operational mode of the UWB tags 120 can be enabled, as well as an advertising mode, discoverable mode, or other type of operational mode initiated on the smart devices 118. The UWB tags 120, as well as the wireless device 104, can then scan for the Bluetooth or BLE advertising and/or other identifiable RF packets advertised as messages from the devices. The mapping module 138 can initiate to query the UWB tags 116, 120 for a BLE MAC ADDR report, device name, RSSIs, and any other type of device identifying information.

Additionally, the UWB tags 120 can generate an ordered list of proximate smart devices 118 based on RSSI and/or reported transmission power to assess which of the smart devices is the closest to a particular UWB tag. The mapping module 138 implemented by the wireless device 104 can also compare the UWB tag reports against its own database of device identifying information 140 and UWB tag identifiers 142. Additionally, the mapping module 138 can then compare the signal path loss of the signals received from the UWB tags and smart devices to determine which of the UWB tags and smart devices are proximate each other based on similar signal path loss. Notably, a user can override any of the UWB tag and device determined associations, either by a UWB tag itself or by the mapping module, and the user can designate which one of the UWB tags is associated with a particular device or other object.

In implementations, some reported BLE MAC ADDRs may be random addresses due to the BLE privacy feature, and are unresolvable by a UWB tag 120 without an identity resolving key that is otherwise available on the wireless device 104, given that the wireless device has been previously paired with the smart devices 118 using random addressing. For these obscure BLE MAC ADDRs due to random addresses, or unpaired devices not transmitting identifiable information, the wireless device 104 can disambiguate, communicate the appropriate address to the UWB tag 120, and update the database for the UWB tag identifiers 142. A UWB tag identifier 142 can be generated automatically by the mapping module 138, or optionally, a user of the device may be prompted via the user interface 152 to approve or change the generated UWB tag identifiers 142 and designated associations with objects and/or smart devices. For further disambiguation of the UWB tags 120 associated with the smart devices 118 and/or other objects 122 in the environment 114, the camera device 154 can be used to capture the environment image 156. The object detection module 158 can then determine the location of the smart devices 118 and/or the other objects 122 in the environment, and the location information used by the mapping module 138 to generate the location association map 150.

Figure 2:
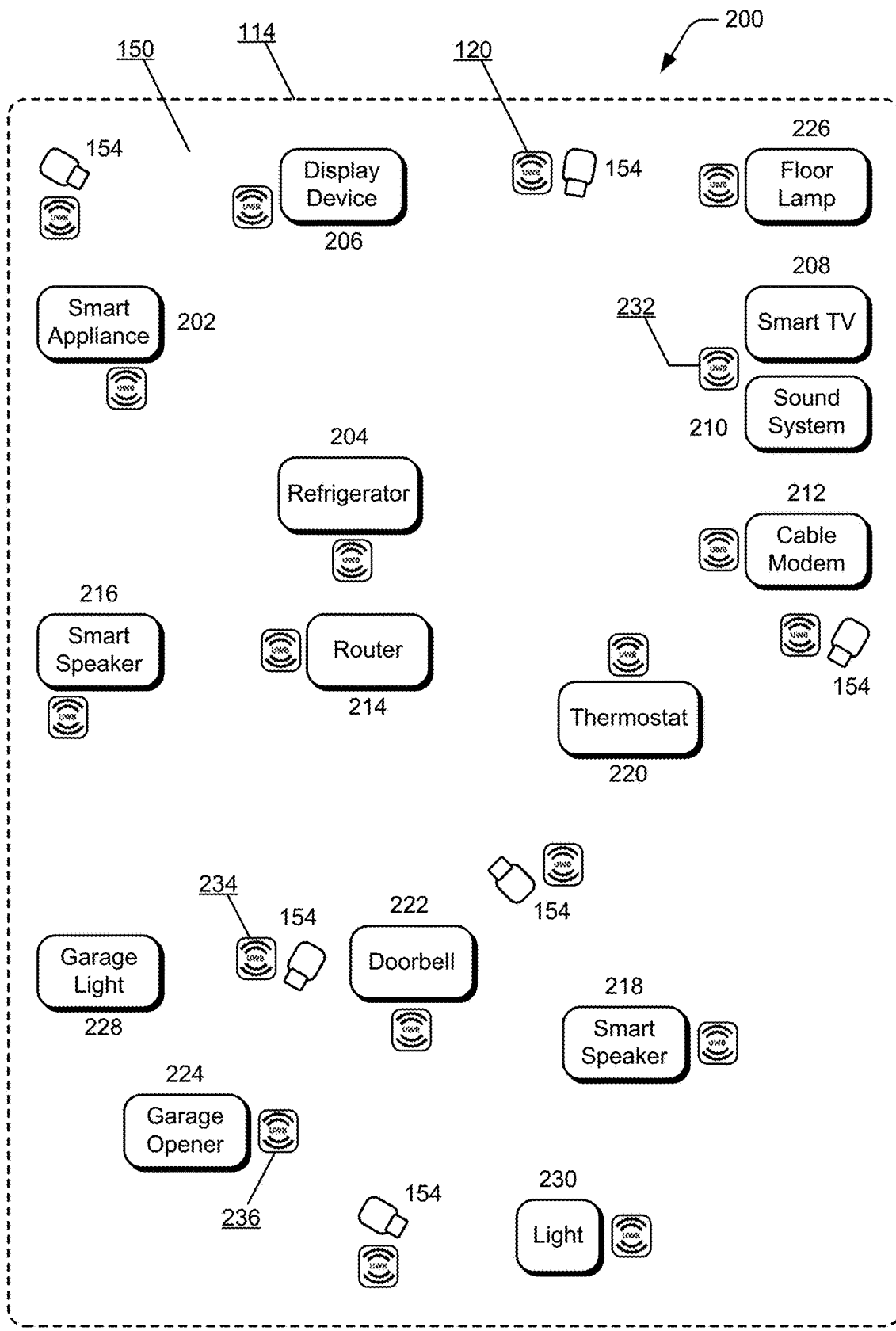
FIGS. 2 and 3 illustrate examples of location association maps generated for environment mapping based on UWB tags in accordance with one or more implementations as described herein.

FIG. 2 illustrates an example 200 of a location association map 150 showing the location of smart devices and/or objects in the environment 114, such as generated by the mapping module 138 implemented by the computing device 102, as shown and described above with reference to FIG. 1. In this example 200, the location association map 150 shows the position of each of the smart devices and other objects relative to each other in the environment 114, as determined based on the precise location positioning capabilities of UWB utilizing the UWB tags 120. The environment 114 includes examples of the smart devices 118, such as a smart appliance 202 and refrigerator 204, a display device 206, a smart TV 208 and sound system 210, smart speakers 216, 218, a cable modem 212 and router 214, a thermostat 220 and smart doorbell 222, and a garage door opener 224. The environment 114 also includes examples of other objects 122, such as a floor lamp 226, a garage light 228, and an outdoor light 230. The environment 114 also includes several examples of camera devices 154 positioned at various locations throughout the environment.

In this example 200, the location association map 150 shows the relative locations of the smart devices and other objects to each other in the environment 114, without walls of the building in the home environment. In an aspect of the environment mapping, it should be noted that one UWB tag can be associated with more than one object and/or smart device in the environment, and can be labeled accordingly to provide the user a meaningful identifier that represents the combined objects and/or smart devices. For example, the UWB tag 232 is positioned for association with both the smart TV 208 and the sound system 210, and the UWB tag may be identified as "entertainment center."

In another aspect of the environment mapping, two or more of the UWB tags can be used to associate and locate objects that are not tagged in their spatial location. For example, the garage light 228 does not have an associated UWB tag. However, the two UWB tags 234, 236 (e.g., in the garage) can be used to determine the relative position of the garage light 228 in the environment for spatial awareness. The associated camera device 154 may also be used to capture an environment image 156 of the region (e.g., in the garage), and the environment image is used to further determine the relative position of the garage light 228 in the environment for spatial awareness.

Figure 3:
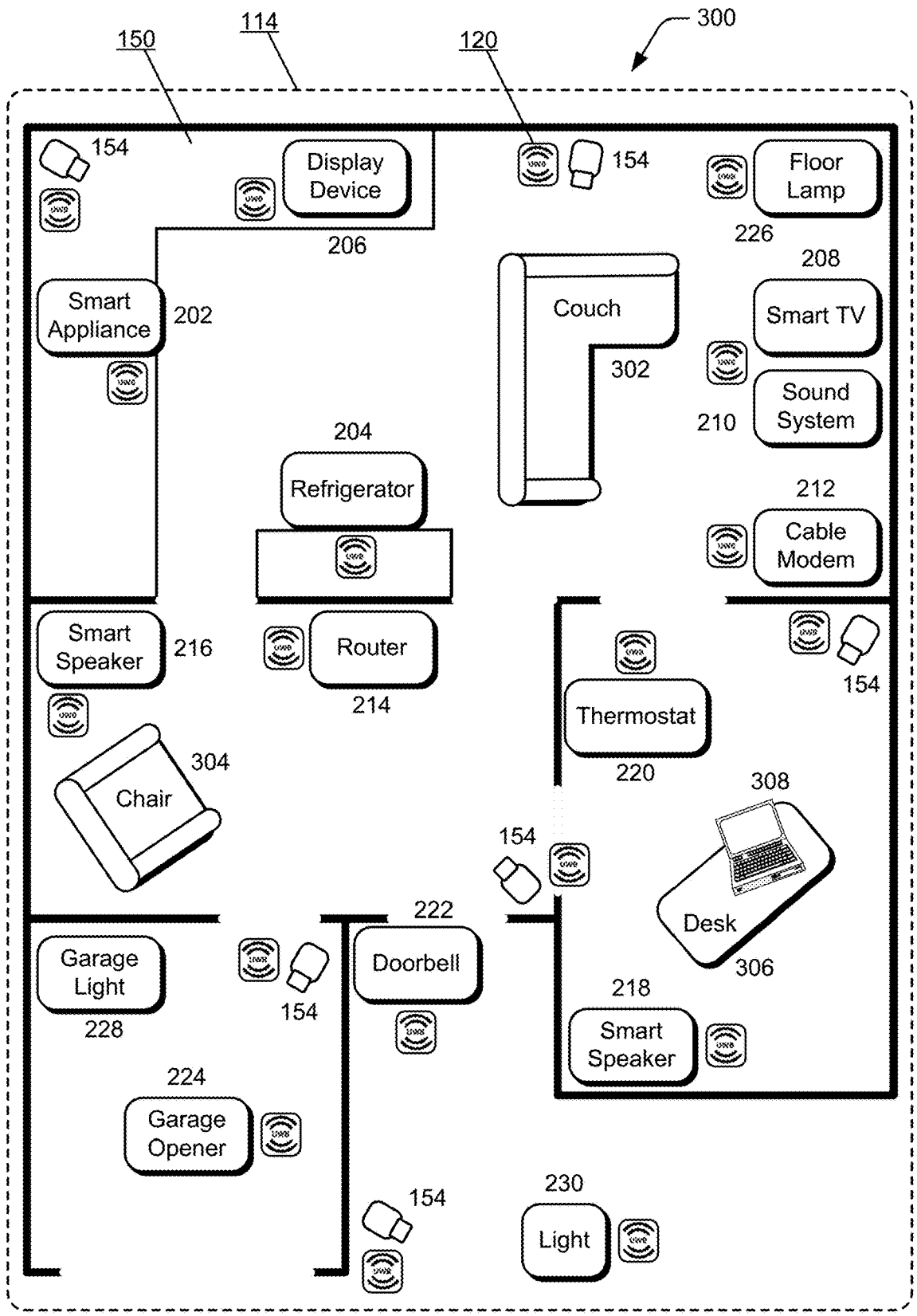

FIG. 3 similarly illustrates an example 300 of a location association map 150 showing the location of the smart devices and/or objects in the environment 114, such as generated by the mapping module 138 implemented by the computing device 102, as shown and described above with reference to FIGS. 1 and 2. Further, in this example 300 of a building environment, the mapping module 138 generates the location association map 150 of the smart devices and the other objects based on the identified objects and smart devices in the environment, as determined by the object detection module 158 from captured environment images 156. The various camera devices 154 positioned at locations throughout the environment 114 can be used to capture the environment images 156 of the different regions of the environment.

The mapping module 138 generates the location association map 150 as a floor plan of the building, including positions of walls of the building as determined from the captured environment images 156. The location association map 150 shows the position of each of the smart devices and other objects relative to each other in the environment 114, as well as the walls of the home environment, which provides a more detailed spatial context. In addition to the smart devices and objects shown in the location association map 150 in FIG. 2, this example 300 also includes other objects determined from the captured environment images 156. For example, the mapped environment also includes the location and position of a couch 302, a chair 304, and a desk 306 in various rooms of the home environment.

Additionally, a UWB-enabled laptop computing device 308 has been added into the environment, and the laptop computing device communicates via a UWB radio with the UWB tags 120 in the environment. The laptop computing device 308 can be implemented as an example of the computing device 102, which is shown and described with reference to FIG. 1. Notably, the laptop computing device 308 can implement the mapping module 138 to facilitate mapping the objects and/or devices in the environment 114, based on the locations and relative positions of each of the UWB tags. The wireless UWB communications for mapping objects and/or devices in the environment 114 are similar between the UWB tags and/or UWB-embedded smart devices in the environment.

Although shown and described as a single-elevation floorplan in the described examples of the location association map 150, the environment 114 may be a multi-elevation home environment. Notably, the system of UWB tags also provides for z-elevation differentiation using the precise location positioning capabilities of UWB for a three-dimension coordinate mapping of a multi-elevation home environment.

Figure 4:
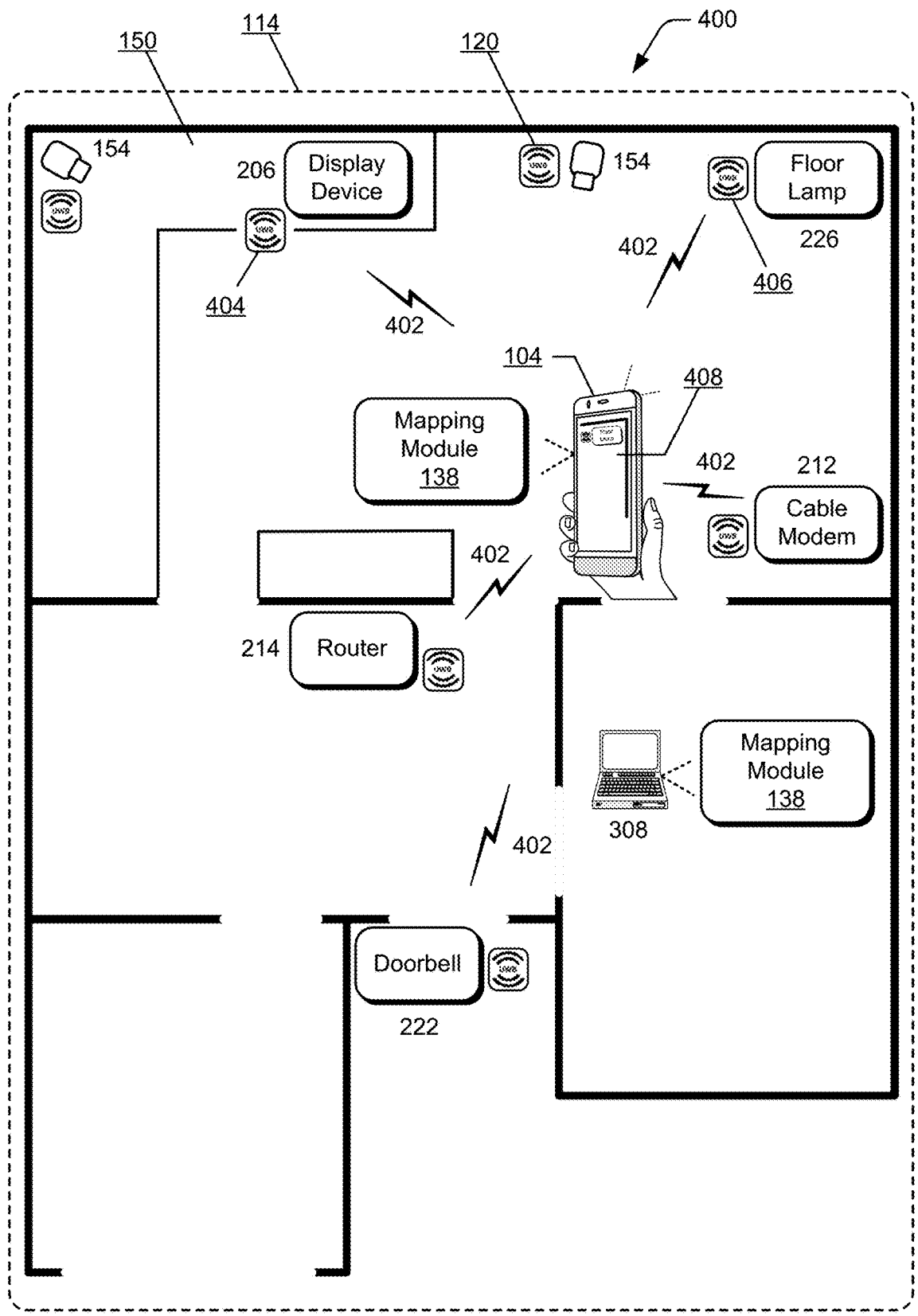
FIG. 4 illustrates examples of UWB tags and devices location association in accordance with one or more implementations described herein.

FIG. 4 further illustrates examples 400 of UWB tags and devices location association in accordance with one or more implementations of environment mapping based on UWB tags, as described herein. The example of the environment 114 as shown in FIG. 3 is further illustrated with additional example details of the mapping module 138, as implemented in a computing device 102, such as the wireless device 104 (e.g., a mobile phone or other device) in the environment. In these examples 400, the wireless device 104 communicates via the UWB radio 132 with the UWB tags 120 in the environment. Similarly, the wireless device 104 can also communicate via the Bluetooth radio 134 and/or the Wi-Fi radio 136 with other smart devices in the environment, such as the display device 206, the cable modem 212, the router 214, the smart doorbell 222, and the laptop computing device 308, to name a few. Although these examples 400 are described with reference to the wireless device 104 implementing the mapping module 138, it should be noted that the laptop computing device 308 may also implement the mapping module 138, and operate independently or in conjunction with the instantiation of the mapping module as implemented by the wireless device.

The mapping module 138 receives (via wireless device 104) the Bluetooth or BLE advertised communications 402 from the UWB tags 120 and other smart devices in the environment 114. The mapping module 138 can then correlate a UWB tag 120 with a nearby smart device based on RSSI measurements of the Bluetooth or BLE advertised communications 402 from the UWB tags and smart devices. For example, the wireless device 104 can receive advertised signals from a UWB tag 404 and the smart display device 206, and the mapping module 138 compares the signal path loss from the received signals to determine that the UWB tag 404 and the smart display device 206 are proximate each other based on similar signal path loss. The mapping module 138 can then associate the UWB tag 404 with the nearby smart display device 206, and communicate the association back to the UWB tag 404, such as via in-band UWB communications.

In a similar implementation, the mapping module 138 receives (via wireless device 104) the Bluetooth or BLE advertised communications 402 from a UWB tag 406 that is proximate a non-tech object, such as the floor lamp 226 in the environment 114. The mapping module 138 can utilize the received signals and a captured environment image 408 to determine that the UWB tag 406 is proximate the floor lamp 226, associate the UWB tag 406 with the nearby object, and communicate the association back to the UWB tag 406, such as via in-band UWB communications. As noted above, a user of the wireless device 104 can override any of the UWB tag and device determined associations by the mapping module, and the user can designate any one of the UWB tags as being associated with a particular device or other object.

Figure 5:
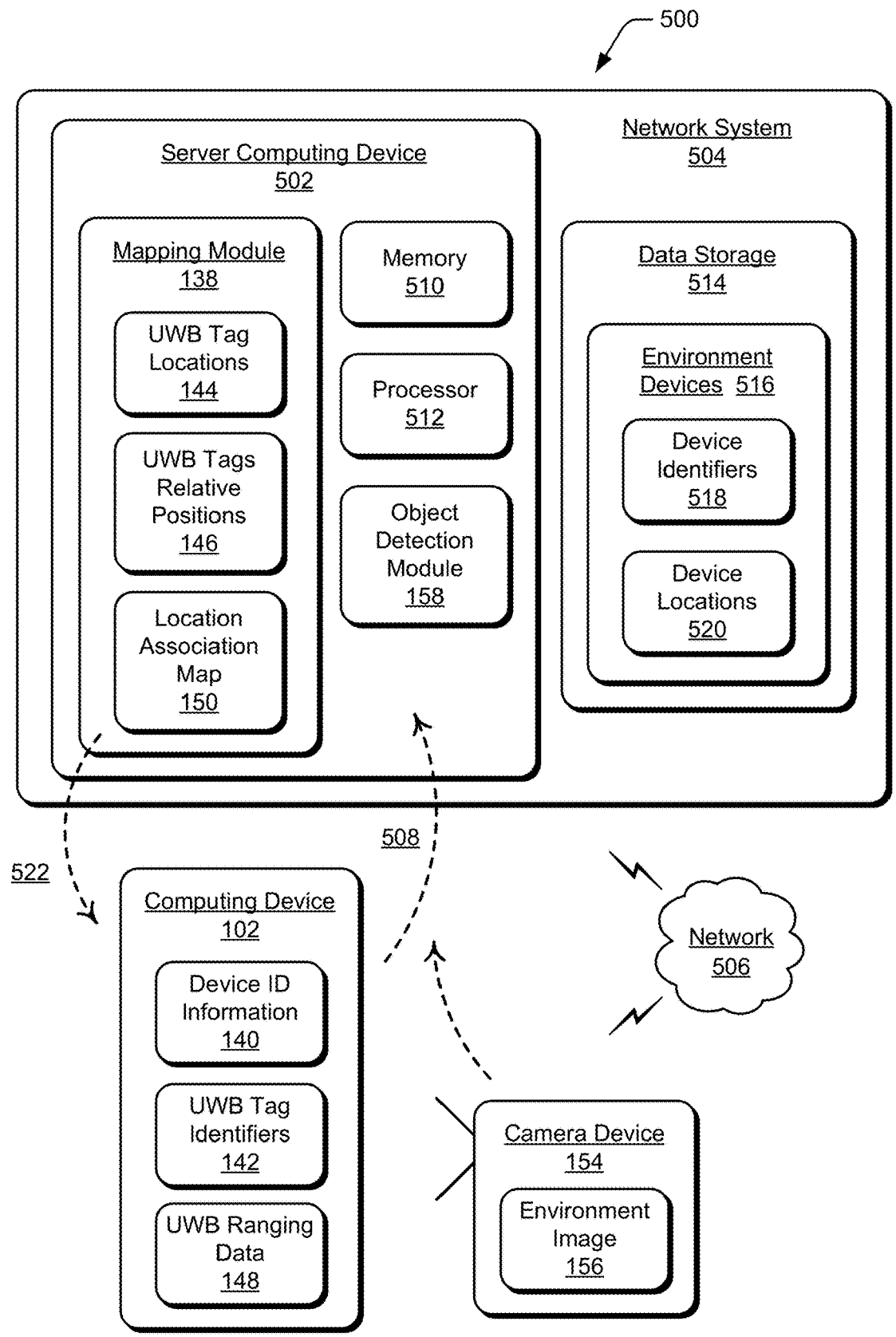
FIG. 5 illustrates an example cloud-based system in which aspects and features of environment mapping based on UWB tags can be implemented.

FIG. 5 illustrates an example of a cloud-based system 500 in which aspects and features of environment mapping based on UWB tags can be implemented. The example system 500 includes the computing device 102 and the camera device 154, such as shown and described with reference to FIG. 1. In this example system 500, the computing device 102 and the camera device 154 are implemented to access and communicate with a server computing device 502 of a network system 504, such as via a communication network 506. The server computing device 502 implements an instantiation of the mapping module 138 to determine the locations 144 of each of the UWB tags 120 in the environment 114, determine the relative positions 146 of each of the UWB tags with respect to each other, and generate the location association map 150. The server computing device 502 can also implement an instantiation of the object detection module 158 to identify the objects and/or smart devices in regions of the environment from the environment images 156 captured by the camera devices 154 positioned in the environment.

The camera device 154 can upload the environment images 156 to the network system 504 via the communication network 506. Similarly, the computing device 102 can upload the received device identifying information 140, the UWB tags identifiers 142, the UWB ranging data 148, and any other type of environment data to the network system 504 for processing and evaluation by the mapping module 138 that is implemented by the server computing device 502. The upload of data from the camera device 154 and/or from the computing device 102 to the network system may be automatically controlled by the respective devices, or optionally, initiated by a user of the devices. The network system 504 can receive the uploaded environment data as inputs to the mapping module 138 from the computing device 102 and/or from the camera device 154, as indicated at 508 via the communication network 506.

Any of the devices, applications, modules, servers, and/or services described herein can communicate via the communication network 506, such as for data communication between the computing device 102 and the network system 504, and for data communication between the camera device 154 and the network system. The communication network 506 can be implemented to include a wired and/or a wireless network. The communication network can also be implemented using any type of network topology and/or communication protocol, and can be represented or otherwise implemented as a combination of two or more networks, to include IP-based networks and/or the Internet. The communication network 506 may also include mobile operator networks that are managed by a mobile network operator and/or other network operators, such as a communication service provider, mobile phone provider, and/or Internet service provider.

In this example cloud-based system 500, the network system 504 is representative of any number of cloud-based access sites that provide a service and/or from which data and information is available, such as via the Internet, for on-line and/or network-based access. The network system 504 can be accessed on-line, and includes the server computing device 502, which is representative of one or more hardware server devices (e.g., computing devices) that may be implemented at the network system. The server computing device 502 includes memory 510 and a processor 512, and may include any number and combination of different components as further described with reference to the example device shown in FIG. 9.

In this example cloud-based system 500, the server computing device 502 implements the mapping module 138 and the object detection module 158, such as in software, in hardware, or as a combination of software and hardware components, generally as shown and described with reference to FIG. 1. In this example, the mapping module 138 and the object detection module 158 are implemented as software applications or modules, such as executable software instructions (e.g., computer-executable instructions) that are executable with a processing system (e.g., the processor 512) of the server computing device 502 to implement the techniques of environment mapping based on UWB tags. The mapping module 138 and the object detection module 158 can be stored on computer-readable storage media, such as any suitable memory device (e.g., the device memory 510) or on electronic data storage implemented in the server computing device 502 and/or at the network system 504.

The network system 504 may include multiple data storage, server devices, and applications, and can be implemented with various components as further described with reference to the example device shown in FIG. 9. The network system 504 includes data storage 514 that may be implemented as any suitable memory or electronic data storage for network-based data storage. The data storage 514 is utilized at the network system 504 to maintain any type of environment data and device information, such as in a database of environment devices 516, with associated device identifiers 518 and device locations 520 in an environment.

The device locations 520 may also include Global Positioning System (GPS) data that indicates the locations of the objects 122 and/or the smart devices 118 in the environment 114, such as in a smart home environment.

The data storage 514 can also be utilized at the network system 504 to maintain any type of the uploaded environment data, such as the uploaded environment images 156 and/or the various UWB tags locations 144 in the environment 114, the UWB tags relative positions 146 with respect to each other, and the location association map 150 determined by the mapping module 138, as shown and described with reference to FIGS. 1-3. The environment and device information determined by the mapping module 138 and/or by the object detection module 158 can then be communicated as feedback from the network system 504 to the computing device 102, as indicated at 522 via the communication network 506.

Example methods 600, 700, and 800 are described with reference to respective FIGS. 6-8 in accordance with implementations for environment mapping based on UWB tags. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASIC s), Application-specific Standard Products (ASSPs), System-on-a-chip systems (SoCs), Complex Programmable Logic Devices (CPLDs), and the like.

Figure 6:
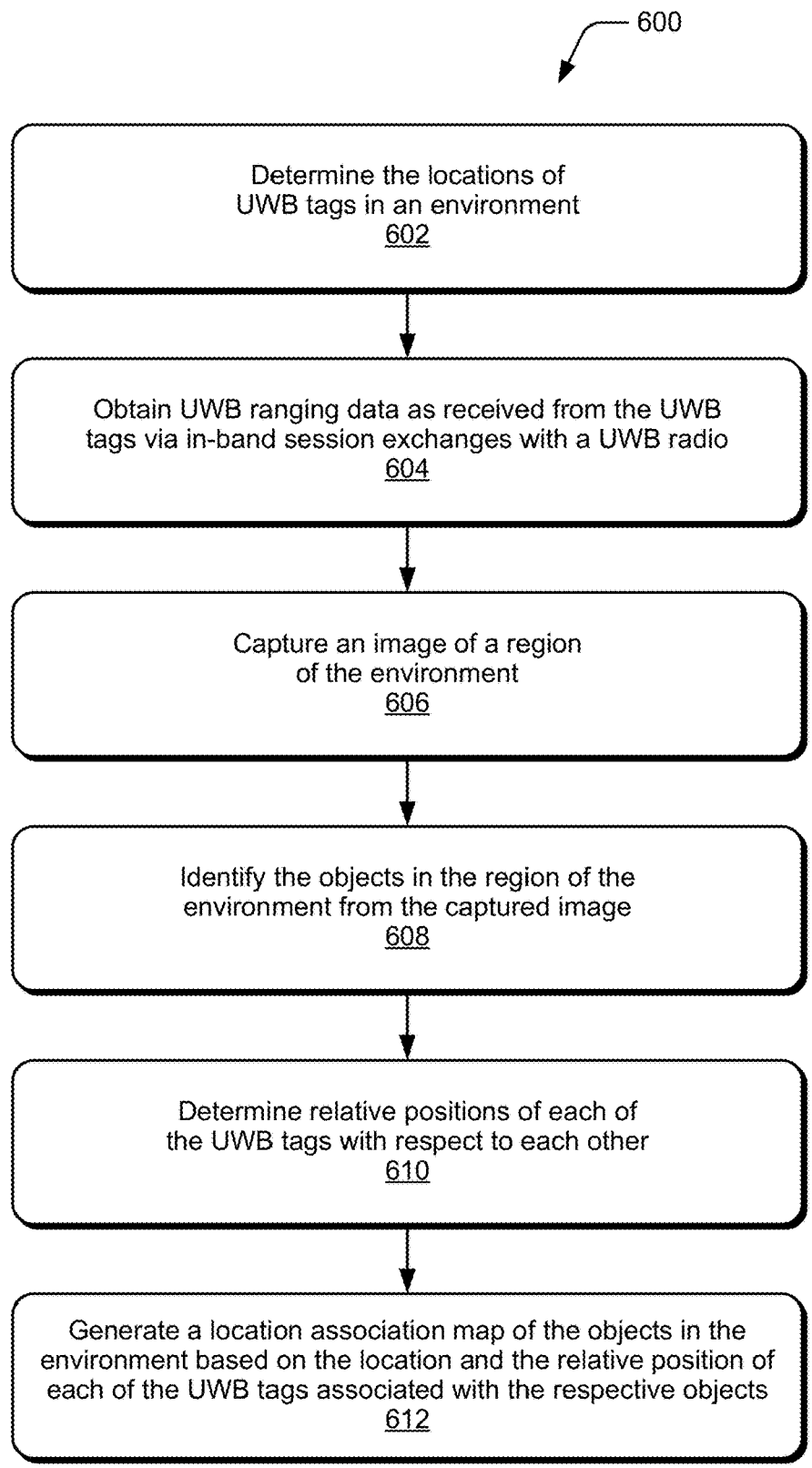
FIGS. 6-8 illustrate example methods for environment mapping based on UWB tags in accordance with one or more implementations of the techniques described herein.

FIG. 6 illustrates example method(s) 600 for environment mapping based on UWB tags, and is generally described with reference to a mapping module implemented by a computing device. The order in which the method is described is not intended to be construed as a limitation, and any number or combination of the described method operations can be performed in any order to perform a method, or an alternate method.

At 602, a determination is made as to the locations of UWB tags in an environment. For example, the mapping module 138 implemented by the computing device 102 determines a UWB tag location 144 of each of the UWB tags 120 in the environment 114. The UWB tags 120 are located for association with respective objects 122 and/or smart devices 118 in the environment 114, and each UWB tag is identified with a digital label 124 indicative of the association with one or more of the objects and/or smart devices.

At 604, UWB ranging data is obtained as received from the UWB tags via in-band session exchanges with a UWB radio. For example, the mapping module 138 implemented by the computing device 102 obtains the UWB ranging data 148, such as time-of-flight (ToF), angle-of-arrival (AoA), and/or time-difference-of-arrival (TDoA) data, which is received from the UWB tags 120 via in-band session exchanges with the UWB radio 132 of the computing device.

At 606, an image is captured of a region of the environment, and at 608, the objects in the region of the environment are identified from the captured image. For example, the camera device 154 in the environment 114 captures an image 156 of the environment, or a region of the environment, and the object detection module 158 identifies the objects 122 and/or the smart devices 118 in the region of the environment from the captured image.

At 610, a determination is made as to the relative positions of each of the UWB tags with respect to each other. For example, the mapping module 138 implemented by the computing device 102 determines the relative positions 146 of each of the UWB tags 120 with respect to each other in the environment based on the UWB ranging data 148. Alternatively or in addition, the mapping module 138 determines the locations 144 and relative positions 146 of each of the UWB tags 120 in the region of the environment based on the identified objects from the environment image 156 of the environment.

At 612, a location association map of the objects in the environment is generated based on the location and the relative position of each of the UWB tags associated with the respective objects. For example, the mapping module 138 implemented by the computing device 102 generates the location association map 150 of the smart devices 118 and/or the objects 122 in the environment 114 based on the location 144 and the relative position 146 of each of the UWB tags 120 associated with the respective smart devices and objects. For a smart home environment, the mapping module 138 can generate the location association map 150 as a floor plan in a three-dimension coordinate system of the environment 114, including the location of the smart devices and/or the objects in the building environment. For objects and/or smart devices determined from environment images 156 captured with one or more camera devices 154, the mapping module 138 generates the location association map 150 as a floor plan of the building, including the objects and/or the smart devices locations in the building, with the floor plan including positions of walls of the building as determined from the captured environment images 156.

Figure 7:
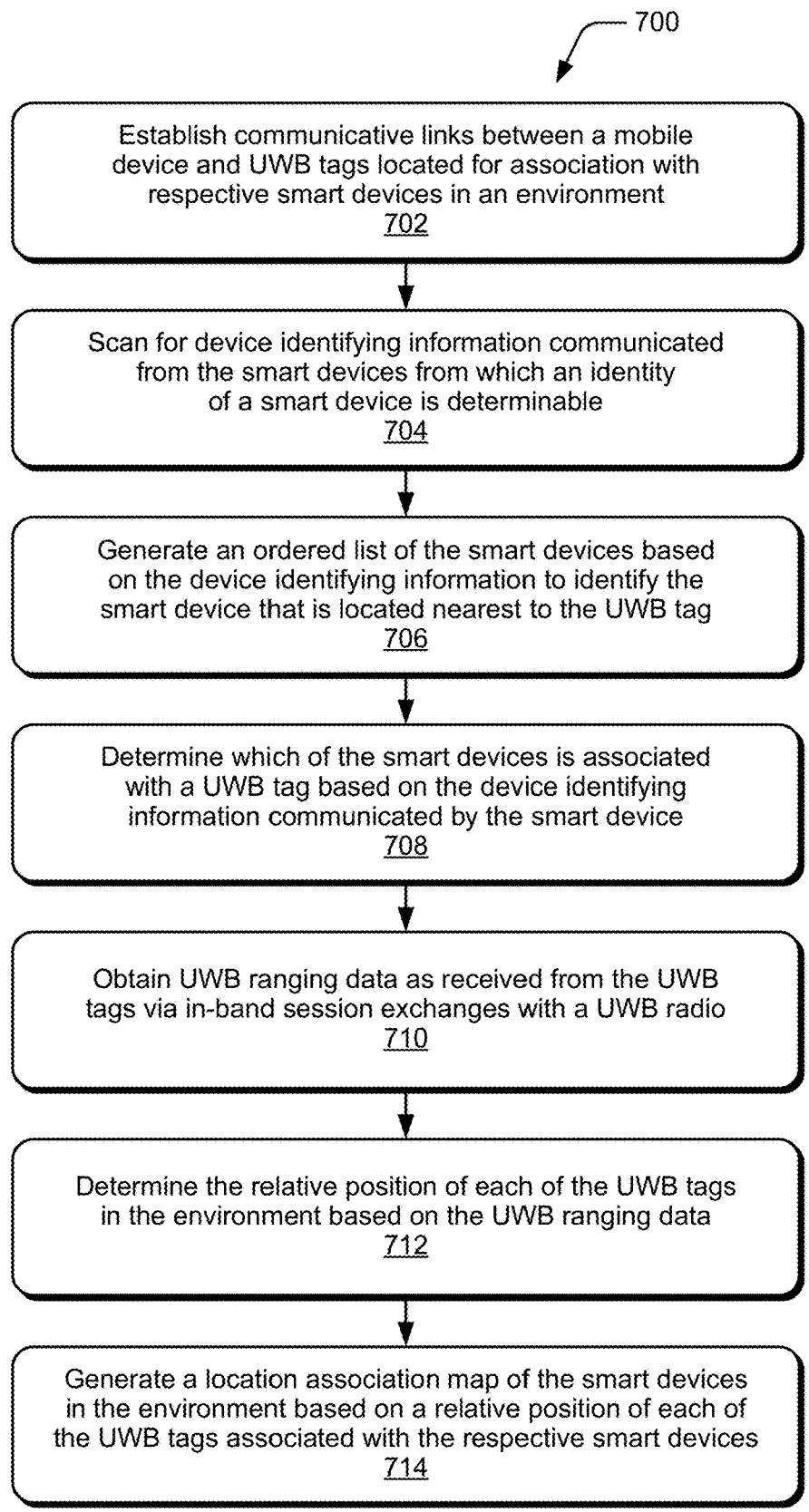

FIG. 7 illustrates example method(s) 700 for environment mapping based on UWB tags, and is generally described with reference to a mapping module implemented by a computing device. The order in which the method is described is not intended to be construed as a limitation, and any number or combination of the described method operations can be performed in any order to perform a method, or an alternate method.

At 702, communicative links are established between a mobile device and UWB tags located for association with respective smart devices in an environment. For example, the wireless device 104 is communicatively linked, generally by wireless connection, to the UWB tags 120 in the environment 114, which can include the computing device 102.

At 704, device identifying information communicated from the smart devices is scanned for, and from which an identity of a smart device is determinable. For example, the UWB tags 120 scan for the device identifying information 140 communicated from the smart devices 118 in the environment. The device identifying information 140 can be communicated via Bluetooth or BLE from the smart devices 118 as a device name, a Bluetooth MAC ADDR, received signal strength indication (RSSI)s, and any other device identifying information. Additionally, the mapping module 138 implemented by the computing device 102 can receive the device identifying information 140 communicated from the smart devices 118 in the environment, as well as the UWB tag identifiers 142 communicated from the UWB tags in the environment.

At 706, an ordered list of the smart devices is generated based on the device identifying information to identify the smart device that is located nearest to the UWB tag, and at 708, a determination is made as to which of the smart devices is associated with a UWB tag based on the device identifying information communicated by the smart device. For example, each of the UWB tags 120 can identify the smart device 118 that is located nearest to the UWB tag based on the device identifying information 140 received from the smart devices, and generates an ordered list of the smart devices based on the device identifying information to identify the smart device that is located nearest to the UWB tag. Alternatively, the mapping module 138 receives (via a computing device 102) the Bluetooth or BLE advertised communications from the UWB tags 120 and other smart devices in the environment 114. The mapping module 138 can then correlate a UWB tag 120 with a nearby smart device based on RSSI measurements of the Bluetooth or BLE advertised communications from the UWB tags and smart devices based on similar signal path loss. The mapping module 138 can then associate a UWB tag with a nearby smart device, and communicate the association back to the UWB tag, such as via in-band UWB communications.

At 710, UWB ranging data is obtained as received from the UWB tags via in-band session exchanges with a UWB radio. For example, the mapping module 138 implemented by the computing device 102 receives the UWB ranging data 148, such as time-of-flight (ToF), angle-of-arrival (AoA), and/or time-difference-of-arrival (TDoA) data, which is received from the UWB tags 120 via in-band session exchanges with the UWB radio 132 of the computing device.

At 712, a determination is made as to the relative position of each of the UWB tags in the environment based on the UWB ranging data. For example, a UWB tag 116 that is located for association with the smart device 118 in the environment 114 can determine an identity of the smart device based on device identifying information, such as a Bluetooth MAC ADDR, communicated from the smart device. Additionally, the UWB tag 116 can utilize received Wi-Fi or Bluetooth RSSI measurements in conjunction with the UWB positioning information to generate and sort a list of nearby smart devices, and select the MAC ADDR of the smart device closest to the UWB tag. Further, in an environment 114 that includes the computing device 102, such as a mobile phone, smartphone, or other wireless device that has a network association with the smart device 118, the UWB tag 116 that is located for association with the smart device 118 in the environment can receive an identity of the smart device 118 from the computing device.

At 714, a location association map of the smart devices in the environment is generated based on a relative position of each of the UWB tags associated with the respective smart devices. For example, the mapping module 138 implemented by the computing device 102 generates the location association map 150 of the smart devices 118 and/or the objects 122 in the environment 114 based on the location 144 and the relative position 146 of each of the UWB tags 120 associated with the respective smart devices and objects. For a smart home environment, the mapping module 138 can generate the location association map 150 as a floor plan in a three-dimension coordinate system of the environment 114, including the location of the smart devices and/or the objects in the building environment. For objects and/or smart devices determined from environment images 156 captured with one or more camera devices 154, the mapping module 138 generates the location association map 150 as a floor plan of the building, including the objects and/or the smart devices locations in the building, with the floor plan including positions of walls of the building as determined from the captured environment images 156.

Figure 8:
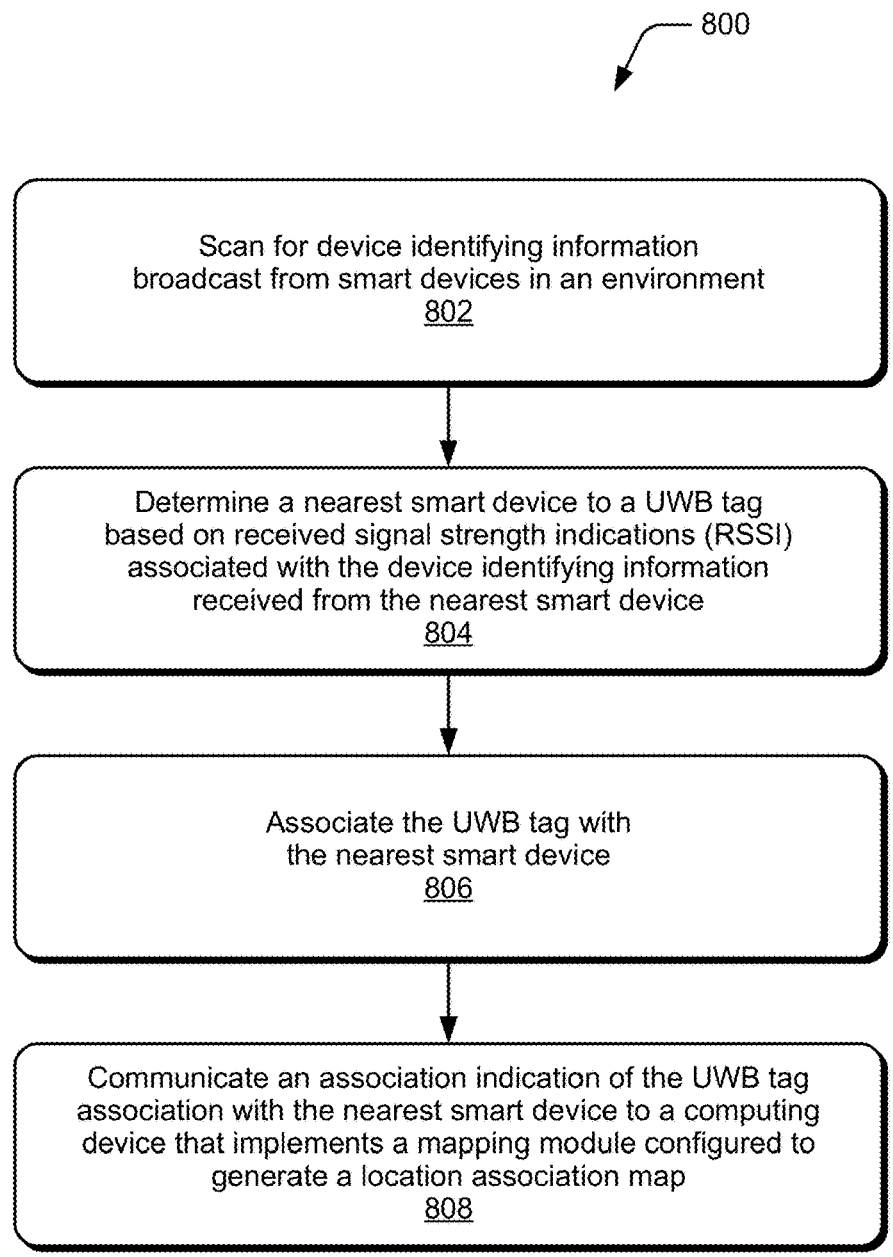

FIG. 8 illustrates example method(s) 800 for environment mapping based on UWB tags. The order in which the method is described is not intended to be construed as a limitation, and any number or combination of the described method operations can be performed in any order to perform a method, or an alternate method.

At 802, device identifying information that is broadcast from smart devices in an environment is scanned for by UWB tags. For example, one or more UWB tags 120 are located for association with respective smart devices 118 in the environment 114, and each UWB tag is identified with a digital label 124 indicative of the association with one of the smart devices. The one or more UWB tags 120 scan for the device identifying information 140 broadcast from the smart devices. In implementations, the one or more UWB tags 120 receive the device identifying information communicated as Bluetooth or Bluetooth Low Energy (BLE) from the smart devices as a device name, a Bluetooth MAC ADDR, received signal strength indications (RSSI), and/or any other type of device identifying information.

At 804, a nearest smart device to a UWB tag is determined based on received signal strength indications (RSSI) associated with the device identifying information received from the nearest smart device. For example, each of the one or more UWB tags 120 can determine a nearest smart device 118 to a UWB tag based on a received signal strength indications (RSSI) associated with the device identifying information 140 received from the nearest smart device.

At 806, the UWB tag is associated with the nearest smart device. For example, each of the one or more UWB tags 120 can associate itself with the nearest smart device 118, as determined based on the received device identifying information 140.

At 808, an association indication of the UWB tag association with the nearest smart device is communicated to a computing device that implements a mapping module configured to generate a location association map. For example, each of the one or more UWB tags 120 can then communicate its association indication of the UWB tag association with the nearest smart device to a computing device 102 that implements the mapping module 138, which generates the location association map 150 of the UWB tags association with the respective smart devices 118 in the environment 114 based on the association indications received from the UWB tags.

Figure 9:
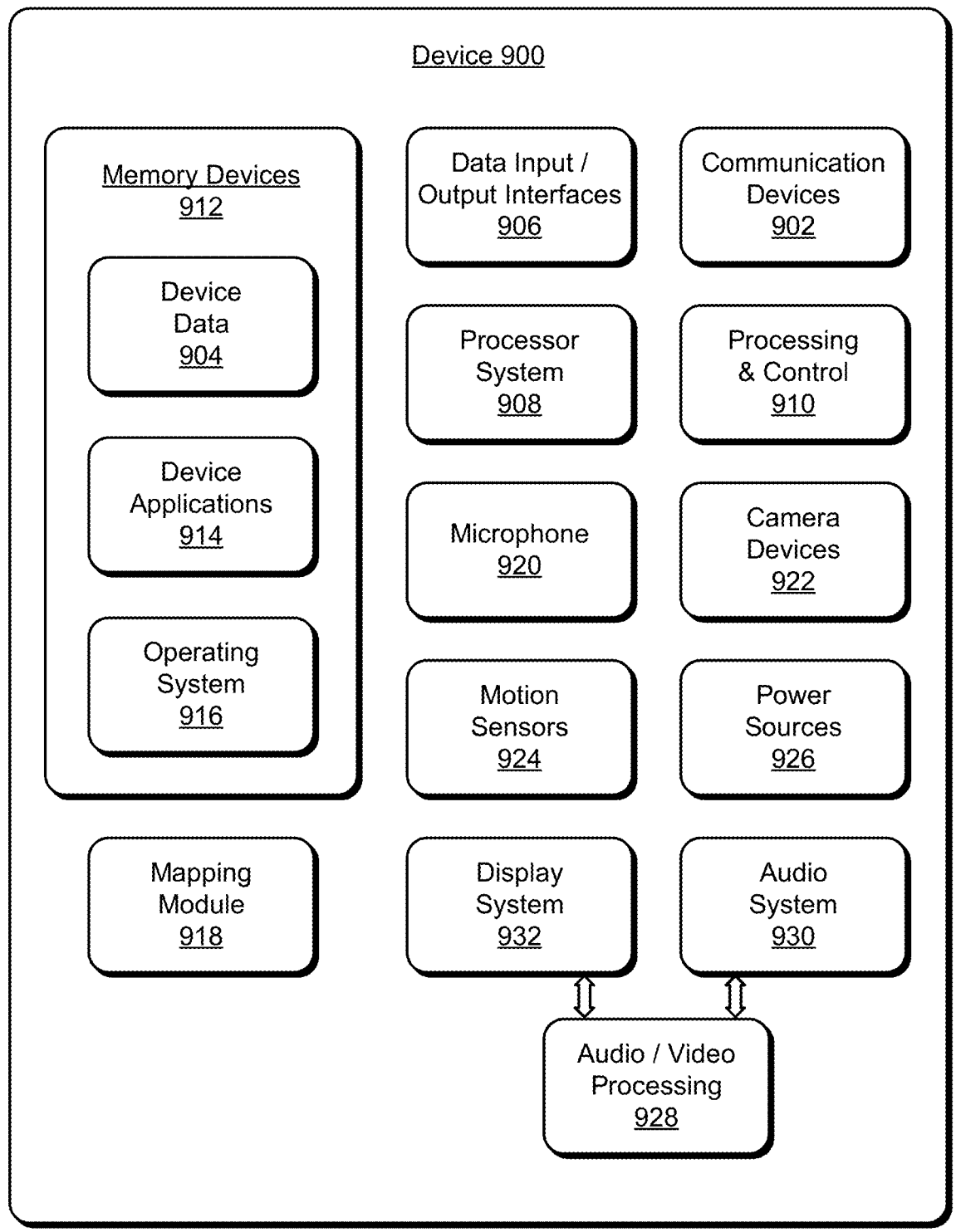
FIG. 9 illustrates various components of an example device that can be used to implement the techniques for environment mapping based on UWB tags as described herein.

FIG. 9 illustrates various components of an example device 900, which can implement aspects of the techniques and features for environment mapping based on UWB tags, as described herein. The example device 900 can be implemented as any of the devices described with reference to the previous FIGS. 1-8, such as any type of a wireless device, mobile device, mobile phone, flip phone, client device, companion device, paired device, display device, tablet, computing, communication, entertainment, gaming, media playback, and/or any other type of computing and/or electronic device. For example, the computing device 102, the camera device 154, and/or a UWB tag 120 described with reference to FIGS. 1-8 may be implemented as the example device 900.

The example device 900 can include various, different communication devices 902 that enable wired and/or wireless communication of device data 904 with other devices. The device data 904 can include any of the various devices data and content that is generated, processed, determined, received, stored, and/or communicated from one computing device to another. Generally, the device data 904 can include any form of audio, video, image, graphics, and/or electronic data that is generated by applications executing on a device. The communication devices 902 can also include transceivers for cellular phone communication and/or for any type of network data communication.

The example device 900 can also include various, different types of data input/output (I/O) interfaces 906, such as data network interfaces that provide connection and/or communication links between the devices, data networks, and other devices. The I/O interfaces 906 can be used to couple the device to any type of components, peripherals, and/or accessory devices, such as a computer input device that may be integrated with the example device 900. The I/O interfaces 906 may also include data input ports via which any type of data, information, media content, communications, messages, and/or inputs can be received, such as user inputs to the device, as well as any type of audio, video, image, graphics, and/or electronic data received from any content and/or data source.

The example device 900 includes a processor system 908 of one or more processors (e.g., any of microprocessors, controllers, and the like) and/or a processor and memory system implemented as a system-on-chip (SoC) that processes computer-executable instructions. The processor system 908 may be implemented at least partially in computer hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that may be implemented in connection with processing and control circuits, which are generally identified at 910. The example device 900 may also include any type of a system bus or other data and command transfer system that couples the various components within the device. A system bus can include any one or combination of different bus structures and architectures, as well as control and data lines.

The example device 900 also includes memory and/or memory devices 912 (e.g., computer-readable storage memory) that enable data storage, such as data storage devices implemented in hardware which can be accessed by a computing device, and that provide persistent storage of data and executable instructions (e.g., software applications, programs, functions, and the like). Examples of the memory devices 912 include volatile memory and non-volatile memory, fixed and removable media devices, and any suitable memory device or electronic data storage that maintains data for computing device access. The memory devices 912 can include various implementations of random-access memory (RAM), read-only memory (ROM), flash memory, and other types of storage media in various memory device configurations. The example device 900 may also include a mass storage media device.

The memory devices 912 (e.g., as computer-readable storage memory) provide data storage mechanisms, such as to store the device data 904, other types of information and/or electronic data, and various device applications 914 (e.g., software applications and/or modules). For example, an operating system 916 can be maintained as software instructions with a memory device 912 and executed by the processor system 908 as a software application. The device applications 914 may also include a device manager, such as any form of a control application, software application, signal-processing and control module, code that is specific to a particular device, a hardware abstraction layer for a particular device, and so on.

In this example, the device 900 includes a mapping module 918 that implements various aspects of the described features and techniques for environment mapping based on UWB tags. The mapping module 918 can be implemented with hardware components and/or in software as one of the device applications 914, such as when the example device 900 is implemented as the computing device 102 and/or the camera device 154 described with reference to FIGS. 1-8. An example of the mapping module 918 includes the mapping module 138 that is implemented by the computing device 102, such as a software application and/or as hardware components in the computing device. In implementations, the mapping module 918 may include independent processing, memory, and logic components as a computing and/or electronic device integrated with the example device 900.

The example device 900 can also include a microphone 920 and/or camera devices 922, as well as motion sensors 924, such as may be implemented as components of an inertial measurement unit (IMU). The motion sensors 924 can be implemented with various sensors, such as a gyroscope, an accelerometer, and/or other types of motion sensors to sense motion of the device. The motion sensors 924 can generate sensor data vectors having three-dimensional parameters (e.g., rotational vectors in x, y, and z-axis coordinates) indicating location, position, acceleration, rotational speed, and/or orientation of the device. The example device 900 can also include one or more power sources 926, such as when the device is implemented as a wireless device and/or mobile device. The power sources may include a charging and/or power system, and can be implemented as a flexible strip battery, a rechargeable battery, a charged super-capacitor, and/or any other type of active or passive power source.

The example device 900 can also include an audio and/or video processing system 928 that generates audio data for an audio system 930 and/or generates display data for a display system 932. The audio system and/or the display system may include any types of devices or modules that generate, process, display, and/or otherwise render audio, video, display, and/or image data. Display data and audio signals can be communicated to an audio component and/or to a display component via any type of audio and/or video connection or data link. In implementations, the audio system and/or the display system are integrated components of the example device 900. Alternatively, the audio system and/or the display system are external, peripheral components to the example device.

Although implementations for environment mapping based on UWB tags have been described in language specific to features and/or methods, the appended claims are not necessarily limited to the specific features or methods described. Rather, the specific features and methods are disclosed as example implementations for environment mapping based on UWB tags, and other equivalent features and methods are intended to be within the scope of the appended claims. Further, various different examples are described and it is to be appreciated that each described example can be implemented independently or in connection with one or more other described examples. Additional aspects of the techniques, features, and/or methods discussed herein relate to one or more of the following:

A system, comprising: UWB tags located for association with respective objects in an environment, each UWB tag identified with a digital label indicative of the association with one or more of the objects; a mapping module implemented at least partially in hardware and configured to: determine a location of each of the UWB tags in the environment; determine relative positions of each of the UWB tags with respect to each other; and generate a location association map of the objects in the environment based on the location and the relative position of each of the UWB tags associated with the respective objects.

Alternatively or in addition to the above described system, any one or combination of: the mapping module is configured to: obtain UWB ranging data received from the UWB tags via in-band session exchanges with a UWB radio, and determine the location and the relative position of each of the UWB tags in the environment based on the UWB ranging data. The mapping module is configured to generate the location association map of the objects in a three-dimension coordinate system. The environment is within a building, and the mapping module is configured to generate the location association map as a floor plan of the building, including the objects location in the building. The system further comprising a mobile device configured to implement the mapping module to generate the location association map of the objects in a three-dimension coordinate system of the environment, and display the location association map on a display screen of the mobile device. A UWB tag is located for the association with a smart device in the environment, and the UWB tag is configured to determine an identity of the smart device based on device identifying information communicated from the smart device. The system further comprising a mobile device configured for network association with the UWB tags and smart devices in the environment, the mobile device configured to implement the mapping module and receive device identifying information from the UWB tags and the smart devices; and wherein the mapping module is configured to determine a nearest smart device to a UWB tag based on a received signal strength indication (RSSI) associated with the device identifying information received from the UWB tag and the nearest smart device, and associate the UWB tag with the nearest smart device. The system further comprising a camera device configured to capture an image of a region of the environment; an object detection module configured to identify the objects in the region of the environment from the captured image; and the mapping module is configured to determine the location and the relative position of each of the UWB tags in the region of the environment based on the identified objects in the region of the environment. The environment is within a building, and the mapping module is configured to generate the location association map as a floor plan of the building, including the objects location in the building, the floor plan including positions of walls of the building as determined from the captured image.

A method, comprising: establishing communicative links between a mobile device and UWB tags located for association with respective smart devices in an environment; scanning for device identifying information communicated from the smart devices from which an identity of a smart device is determinable; determining which of the smart devices is associated with a UWB tag based on the device identifying information communicated by the smart device; and generating a location association map of the smart devices in the environment based on a relative position of each of the UWB tags associated with the respective smart devices.

Alternatively or in addition to the above described method, any one or combination of: obtaining UWB ranging data received from the UWB tags via in-band session exchanges with a UWB radio, determining the relative position of each of the UWB tags in the environment based on the UWB ranging data. The location association map is generated in a three-dimension coordinate system, including the relative position of each of the UWB tags in the environment. The environment is within a building, and the location association map is generated as a floor plan of the building, including the relative position of each of the UWB tags in the building. The device identifying information is communicated via Bluetooth or Bluetooth Low Energy (BLE) from the smart devices as a device name, a Bluetooth MAC ADDR, and a received signal strength indication (RSSI); the scanning is by the UWB tags to receive the device identifying information communicated from the smart devices; and the determining is by the UWB tag to identify the smart device that is located nearest to the UWB tag based on the device identifying information received from the smart devices. The method further comprising generating, by each of the UWB tags, an ordered list of the smart devices based on the device identifying information to identify the smart device that is located nearest to the UWB tag. The device identifying information is communicated via Bluetooth or Bluetooth Low Energy (BLE) from the smart devices as a device name, a Bluetooth MAC ADDR, and a received signal strength indication (RSSI); the scanning is by the mobile device to receive the device identifying information communicated from the smart devices; and the determining is by the mobile device to identify the smart device that is located nearest to the UWB tag based on the device identifying information received from the smart devices. The method further comprising capturing an image of a region of the environment; identifying objects in the region of the environment from the captured image; and determining a location and the relative position of each of the UWB tags in the region of the environment based on the identified objects in the region of the environment. The environment is within a building, and the generating the location association map as a floor plan of the building, including the objects location in the building, the floor plan including positions of walls of the building as determined from the captured image.

A system, comprising: one or more UWB tags located for association with respective smart devices in an environment, each UWB tag identified with a digital label indicative of the association with one of the smart devices, the one or more UWB tags each configured to: scan for device identifying information broadcast from the smart devices; determine a nearest smart device to a UWB tag based on a received signal strength indications (RSSI) associated with the device identifying information received from the UWB tag and the nearest smart device; associate the UWB tag with the nearest smart device; and communicate an association indication of the UWB tag association with the nearest smart device to a computing device that implements a mapping module configured to generate a location association map of the UWB tags association with the respective smart devices in the environment based on the association indications received from the UWB tags.

Alternatively or in addition to the above described system, any one or combination of: the one or more UWB tags are configured to receive the device identifying information communicated as Bluetooth or Bluetooth Low Energy (BLE) from the smart devices as a device name, a Bluetooth MAC ADDR, and a received signal strength indication (RSSI).

The invention claimed is:

1. A system, comprising:
ultra-wideband (UWB) tags located for association with smart devices in an environment, each of the UWB tags identified with a digital label indicative of the association with one or more of the smart devices; and
a mapping module implemented at least partially in hardware of a smart device and configured to:
receive UWB positioning data and device identifying information communicated from the smart devices from which an identity of a smart device of the smart devices is determinable;
determine relative positions of each of the UWB tags with respect to each other based on a location of each of the UWB tags;
determine which of the smart devices is associated with a UWB tag based on the device identifying information communicated by the smart device and the relative positions of each of the UWB tags; and
generate a location association map of the smart devices in the environment based on the location and the relative positions of each of the UWB tags associated with the smart devices.

2. The system of claim 1, wherein the mapping module is configured to generate the location association map of the smart devices in a three-dimension coordinate system.

3. The system of claim 1, wherein:
the environment is within a building; and
the mapping module is configured to generate the location association map as a floor plan of the building, including locations of the smart devices in the building.

4. The system of claim 1, further comprising a mobile device configured to:
implement the mapping module to generate the location association map of the smart devices in a three-dimension coordinate system of the environment; and
display the location association map on a display screen of the mobile device.

5. The system of claim 1, wherein a UWB tag is located for association with the smart device in the environment, and the UWB tag is configured to determine the identity of the smart device based on the device identifying information communicated from the smart device.

6. The system of claim 1, further comprising a mobile device configured for network association with the UWB tags and the smart devices in the environment, the mobile device configured to implement the mapping module and receive the device identifying information from the UWB tags and the smart devices; and
wherein the mapping module is configured to:
determine a nearest smart device to a UWB tag based on a received signal strength indication (RSSI) associated with the device identifying information received from the UWB tag and the nearest smart device; and
associate the UWB tag with the nearest smart device.

7. The system of claim 1, further comprising:
a camera device configured to capture an image of a region of the environment;
a smart device detection module configured to identify the smart devices in the region of the environment from the image; and
wherein the mapping module is configured to determine the location and the relative positions of each of the UWB tags in the region of the environment based on identified smart devices in the region of the environment.

8. The system of claim 7, wherein:
the environment is within a building; and
the mapping module is configured to generate the location association map as a floor plan of the building, including a location of each of the smart devices in the building, the floor plan including positions of walls of the building as determined from the image.

9. A method, comprising:
establishing communicative links between a mobile device and ultra-wideband (UWB) tags located for association with respective smart devices in an environment;
receiving UWB positioning data and device identifying information communicated from the smart devices from which an identity of a smart device is determinable;
determining a relative position of each of the UWB tags in the environment based on the UWB positioning data;
determining which of the smart devices is associated with a UWB tag based on the device identifying information communicated by the smart device and the relative position of each of the UWB tags; and
generating a location association map of the smart devices in the environment based on the relative position of each of the UWB tags associated with the respective smart devices.

10. The method of claim 9, further comprising:
receiving the UWB positioning data received from the UWB tags via in-band session exchanges with a UWB radio.

11. The method of claim 9, wherein the location association map is generated in a three-dimension coordinate system, including the relative position of each of the UWB tags in the environment.

12. The method of claim 9, wherein:
the environment is within a building; and
the location association map is generated as a floor plan of the building, including the relative position of each of the UWB tags in the building.

13. The method of claim 9, wherein:
the device identifying information is communicated via Bluetooth or Bluetooth Low Energy (BLE) from the smart devices as a device name, a Bluetooth MAC ADDR, and a received signal strength indication (RSSI);
the receiving is by the UWB tags to receive the device identifying information communicated from the smart devices; and
the determining is by the UWB tag to identify the smart device that is located nearest to the UWB tag based on the device identifying information received from the smart devices.

14. The method of claim 13, further comprising:
generating, by each of the UWB tags, an ordered list of the smart devices based on the device identifying information to identify the smart device that is located nearest to the UWB tag.

15. The method of claim 9, wherein:
the device identifying information is communicated via Bluetooth or Bluetooth Low Energy (BLE) from the smart devices as a device name, a Bluetooth MAC ADDR, and a received signal strength indication (RSSI);

the receiving is by the mobile device to receive the device identifying information communicated from the smart devices; and the determining is by the mobile device to identify the smart device that is located nearest to the UWB tag based on the device identifying information received from the smart devices.

16. The method of claim 9, further comprising:

capturing an image of a region of the environment;

identifying smart devices in the region of the environment from the image; and determining a location and the relative position of each of the UWB tags in the region of the environment based on the smart devices in the region of the environment.

17. The method of claim 16, wherein:

the environment is within a building; and the generating the location association map as a floor plan of the building, including locations of the smart devices in the building, the floor plan including positions of walls of the building as determined from the image.

18. A system, comprising:

one or more ultra-wideband (UWB) tags located for association with smart devices in an environment, each UWB tag identified with a digital label indicative of the association with one of the smart devices, the smart devices configured to:

receive UWB positioning data and identity information;

determine a location of each of the one or more UWB tags in the environment based on the UWB positioning data;

determine a nearest smart device to a UWB tag based on a received signal strength indications (RSSI) associated with device identifying information received from the nearest smart device and based on the identity information;

associate the UWB tag with the nearest smart device; and communicate an association indication of a UWB tag association with the nearest smart device to a computing device that implements a mapping module configured to generate a location association map of the UWB tag association with the smart devices in the environment based on the association indication and the location of each of the one or more UWB tags.

19. The system of claim 18, wherein the one or more UWB tags are configured to receive the device identifying information communicated as Bluetooth or Bluetooth Low Energy (BLE) from the smart devices as a device name, a Bluetooth MAC ADDR, and a received signal strength indication (RSSI).

20. The system of claim 1, further comprising a mobile device configured to automatically identify locations for placement of the UWB tags in the environment.

* * * * *